US012480358B1

(12) United States Patent
Flannery et al.

(10) Patent No.: US 12,480,358 B1
(45) **Date of Patent: *Nov. 25, 2025**

(54) GATE HAVING FOUR PINS AND STAIRWAY POST ADAPTER

(71) Applicants: Mark A. Flannery, Longboat Key, FL (US); Lyle H. Rogalla, Hugo, MN (US)

(72) Inventors: Mark A. Flannery, Longboat Key, FL (US); Lyle H. Rogalla, Hugo, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,615

(22) Filed: Nov. 3, 2024

Related U.S. Application Data

(60) Continuation of application No. 17/989,630, filed on Nov. 17, 2022, now Pat. No. 12,134,934, which is a continuation of application No. 17/686,389, filed on Mar. 3, 2022, now Pat. No. 11,512,527, which is a division of application No. 16/907,772, filed on Jun. 22, 2020, now Pat. No. 11,268,320, which is a division of application No. 15/990,788, filed on May (Continued)

(51) Int. Cl.

| | |
|---|---|
| ***E06B 9/02*** | (2006.01) |
| ***E05B 65/00*** | (2006.01) |
| ***E06B 9/04*** | (2006.01) |
| ***E06B 11/02*** | (2006.01) |
| ***E06B 11/04*** | (2006.01) |
| *E06B 9/00* | (2006.01) |

(52) U.S. Cl.
CPC ............ *E06B 9/02* (2013.01); *E05B 65/0014* (2013.01); *E06B 9/04* (2013.01); *E06B 11/022* (2013.01); *E06B 11/04* (2013.01); *E06B 2009/002* (2013.01)

(58) Field of Classification Search
CPC . E06B 9/02; E06B 9/04; E06B 11/022; E06B 11/04; E06B 2009/002; E05B 65/0007; E05B 65/0014
See application file for complete search history.

(56) References Cited

U.S. PATENT DOCUMENTS 942,067 A 12/1909 Heidt
1,059,415 A * 4/1913 Waters et al. ......... E05F 1/1215 292/335

(Continued)

*Primary Examiner* — Justin B Rephann

(57) ABSTRACT

A gate apparatus that includes a gate, an elongate member or gate base for the ends of the gate, and a stairway post adapter such that a wooden stairway post can serve as a base for a gate without harming the wood of the stairway post. The stairway post adapter includes a vertical or longitudinally running channel for receiving the gate base, a horizontally or laterally extending channel for receiving a strap, and a recess or receptor or face for confronting a section of a stairway post. The gate base includes an upper and lower eyelet. Each of the ends of the gate includes upper and lower pins for engaging the upper and lower eyelets of the gate bases. On the hinge side of the gate, the pins are relatively long and remain in the eyelets as the gate is lifted and swung. On the latch side of the gate, the pins are relatively short such that that latch side of the gate can be lifted and disengaged from the eyelets and then swung open. The gate is extendable and retractable in length, and is reversible.

12 Claims, 15 Drawing Sheets

Related U.S. Application Data 28, 2018, now Pat. No. 10,689,902, which is a division of application No. 15/876,204, filed on Jan. 22, 2018, now Pat. No. 9,982,479, which is a continuation of application No. 15/210,572, filed on Jul. 14, 2016, now Pat. No. 9,874,056, which is a continuation of application No. 14/874,929, filed on Oct. 5, 2015, now Pat. No. 9,394,726, which is a continuation of application No. 14/271,405, filed on May 6, 2014, now Pat. No. 9,151,108, which is a continuation of application No. 12/857,529, filed on Aug. 16, 2010, now Pat. No. 8,713,851.

(60) Provisional application No. 61/297,272, filed on Jan. 21, 2010.

(56) References Cited

U.S. PATENT DOCUMENTS

| | | | | |
|---|---|---|---|---|
| 1,675,033 | A | 6/1928 | Lefkovitz | |
| 2,651,806 | A | 9/1953 | Thompson | |
| 2,763,890 | A | 9/1956 | Cox | |
| 3,030,717 | A * | 4/1962 | Lewis | E06B 11/02 49/245 |
| 3,064,305 | A | 11/1962 | Hill | |
| 3,533,189 | A | 10/1970 | Appell | |
| 3,680,260 | A | 8/1972 | Bauer | |
| 3,811,149 | A | 5/1974 | Griffin | |
| 4,047,332 | A | 9/1977 | Benoit | |
| 4,611,431 | A | 9/1986 | Lauro | |
| 4,677,791 | A | 7/1987 | Larson et al. | |
| 4,685,247 | A | 8/1987 | Alam | |
| 4,702,036 | A | 10/1987 | Johnson | |
| 4,729,149 | A | 3/1988 | Brunkan | |
| 4,831,777 | A | 5/1989 | Johnson, Jr. | |
| 4,862,563 | A | 9/1989 | Flynn | |
| 4,884,614 | A | 12/1989 | Spurling | |
| 5,022,197 | A | 6/1991 | Aragona | |
| 5,060,421 | A | 10/1991 | Castelli | |
| 5,103,658 | A | 4/1992 | McQuade | |
| 5,360,191 | A | 11/1994 | Carson et al. | |
| 5,367,829 | A | 11/1994 | Crossley | |
| 5,457,914 | A | 10/1995 | Johnson, Jr. | |
| 5,535,552 | A | 7/1996 | Stern | |
| 5,593,141 | A | 1/1997 | Cain | |
| 5,632,514 | A | 5/1997 | Johnson, Jr. | |
| 5,664,371 | A | 9/1997 | Berliner | |
| 5,797,218 | A | 8/1998 | Holland | |
| 5,809,694 | A | 9/1998 | Postans | |
| 5,860,250 | A | 1/1999 | Hill et al. | |
| 6,016,629 | A | 1/2000 | Sylvester | |
| 6,112,460 | A | 9/2000 | Wagnitz | |
| 6,112,461 | A | 9/2000 | Cheng | |
| 6,161,334 | A | 12/2000 | Goodin | |
| 6,178,694 | B1 | 1/2001 | Wagnitz | |
| 6,233,874 | B1 | 5/2001 | Johnson, Jr. | |
| 6,253,490 | B1 | 7/2001 | Postans | |
| 6,370,823 | B1 | 4/2002 | Andersen | |
| 6,375,165 | B1 | 4/2002 | Sherratt | |
| 6,516,568 | B2 | 2/2003 | Yang | |
| 6,609,703 | B1 | 8/2003 | D'Arcy | |
| 6,682,029 | B1 | 1/2004 | Dierkes | |
| 6,711,857 | B1 | 3/2004 | Wagnitz et al. | |
| 7,152,372 | B2 | 12/2006 | Cheng | |
| 7,322,153 | B2 | 1/2008 | Nitz et al. | |
| 7,334,624 | B2 | 2/2008 | Waldman et al. | |
| 7,373,755 | B2 | 5/2008 | Jefferys et al. | |
| 7,377,490 | B1 | 5/2008 | Khosravian | |
| 7,404,532 | B1 | 7/2008 | Baril | |
| 7,540,046 | B1 | 6/2009 | Lai | |
| 7,565,769 | B2 | 7/2009 | Monahan | |
| 7,874,103 | B2 | 1/2011 | Yates | |
| 7,975,431 | B2 | 7/2011 | Flannery | |
| 8,136,302 | B2 | 3/2012 | Trujillo | |
| 8,196,348 | B2 | 6/2012 | Flannery | |
| 8,341,886 | B2 | 1/2013 | Yates | |
| 9,140,056 | B2 | 9/2015 | Fitzpatrick | |
| 9,187,939 | B1 | 11/2015 | Bishop | |
| 9,366,075 | B2 | 6/2016 | Marsden | |
| 9,567,797 | B2 | 2/2017 | Fitzpatrick | |
| 9,637,959 | B2 | 5/2017 | Marsden | |
| 10,550,634 | B1 | 2/2020 | Holland | |
| 11,118,398 | B2 | 9/2021 | Kaiser | |
| 11,149,488 | B2 | 10/2021 | Wang | |
| 11,608,675 | B2 * | 3/2023 | Wang | E05B 65/0014 |
| 2001/0025545 | A1 | 10/2001 | Rogers | |
| 2002/0007597 | A1 | 1/2002 | Wang | |
| 2002/0157316 | A1 | 10/2002 | Andersen | |
| 2003/0009945 | A1 | 1/2003 | Cheng | |
| 2004/0238806 | A1 | 12/2004 | Hicks | |
| 2006/0042163 | A1 | 3/2006 | Nitz | |
| 2006/0180284 | A1 | 8/2006 | Wiggins | |
| 2006/0185253 | A1 | 8/2006 | Marsden | |
| 2007/0007402 | A1 | 1/2007 | Dierkes | |
| 2007/0131921 | A1 | 6/2007 | Monahan et al. | |
| 2008/0098658 | A1 | 5/2008 | Niazy | |
| 2008/0256865 | A1 | 10/2008 | Trujillo | |
| 2009/0013604 | A1 | 1/2009 | Yates | |
| 2009/0013606 | A1 | 1/2009 | Yates | |
| 2009/0044450 | A1 | 2/2009 | Hallman | |
| 2009/0071074 | A1 | 3/2009 | Yates | |
| 2009/0211716 | A1 | 8/2009 | Fitzpatrick | |
| 2011/0067309 | A1 | 3/2011 | Hofmann | |
| 2012/0055092 | A1 | 3/2012 | Boucquey et al. | |
| 2012/0090136 | A1 | 4/2012 | Fields | |
| 2012/0324792 | A1 | 12/2012 | Bertsch et al. | |
| 2013/0118088 | A1 | 5/2013 | Yates | |
| 2014/0007506 | A1 | 1/2014 | Huang | |
| 2015/0089873 | A1 | 4/2015 | Marsden | |
| 2015/0101253 | A1 | 4/2015 | Marsden | |
| 2016/0208548 | A1 | 7/2016 | Fitzpatrick | |
| 2017/0058595 | A1 | 3/2017 | Marsden | |
| 2017/0211314 | A1 | 7/2017 | Raffi | |
| 2020/0340295 | A1 | 10/2020 | Wang | |
| 2020/0386049 | A1 | 12/2020 | Kaiser | |
| 2021/0238899 | A1 * | 8/2021 | Marsden | E05C 3/14 |

* cited by examiner

GATE HAVING FOUR PINS AND STAIRWAY POST ADAPTER

This application is a continuation of U.S. patent application Ser. No. 17/989,630 filed Nov. 17, 2022 (U.S. Pat. No. 12,134,934 issued Nov. 5, 2024) and claims the benefit thereof under 35 U.S.C. § 120, which application is a continuation of U.S. patent application Ser. No. 17/686,389 filed Mar. 3, 2022 (U.S. Pat. No. 11,512,527 issued Nov. 29, 2022) and claims the benefit thereof under 35 U.S.C. § 120, which application is a division of U.S. patent application Ser. No. 16/907,772 filed Jun. 22, 2020 (U.S. Pat. No. 11,268,320 issued Mar. 8, 2022) and claims the benefit thereof under 35 U.S.C. § 120, which application is a division of U.S. patent application Ser. No. 15/990,788 filed May 28, 2018 (U.S. Pat. No. 10,689,902 issued Jun. 23, 2020) and claims the benefit thereof under 35 U.S.C. § 120, which application is a division of U.S. patent application Ser. No. 15/876,204 filed Jan. 22, 2018 (U.S. Pat. No. 9,982,479 issued May 29, 2018) and claims the benefit thereof under 35 U.S.C. § 120, which application is a continuation of U.S. patent application Ser. No. 15/210,572 filed Jul. 14, 2016 (U.S. Pat. No. 9,874,056 issued Jan. 23, 2018) and claims the benefit thereof under 35 U.S.C. § 120, which is a continuation of U.S. patent application Ser. No. 14/874,929 filed Oct. 5, 2015 (U.S. Pat. No. 9,394,726 issued Jul. 19, 2016) and claims the benefit thereof under 35 U.S.C. § 120, which is a continuation of U.S. patent application Ser. No. 14/271,405 filed May 6, 2014 (U.S. Pat. No. 9,151,108 issued Oct. 6, 2015) and claims the benefit thereof under 35 U.S.C. § 120, which is a continuation of U.S. patent application Ser. No. 12/857,529 filed Aug. 16, 2010 (U.S. Pat. No. 8,713,851 issued May 6, 2014) and claims the benefit thereof under 35 U.S.C. § 120, which claims the benefit under 35 U.S.C. § 119(e) of U.S. Provisional Patent Application No. 61/297,272 filed Jan. 21, 2010, all of which applications are hereby incorporated by reference in their entireties into this application.

FIELD OF THE INVENTION

The present invention generally relates to a barrier for a residential passageway, particularly to a barrier for a residential passageway that has upper right, lower right, upper left and lower left pins respectively cooperating with upper right, lower right, upper left and lower left eyelets, and specifically to such a barrier that can engage a stairway post.

BACKGROUND OF THE INVENTION

A baluster can be any of a number of closely spaced supports for a railing. A baluster can be any of various symmetrical supports, as furniture legs or spindles, that tend to swell toward the bottom or top. A baluster is typically an upright member. It can be rounded or vase-shaped. It can be referred to as a supporting post, such as a supporting post for a handrail. A conventional material for a baluster is wood. Wood can be readily shaped to be round, conical, or square in section, or have some other shape. A baluster can be square in section, circular in section, or polygonal in section. A baluster can be turned or ornamented. A baluster can be narrow or wide. A baluster can be a miniature column or a bellied, bulbed type of colonette. The thickest and thinnest parts of the baluster can be referred to as the belly and sleeve, respectively.

A balustrade is a railing with supporting balusters. A balustrade is a rail and the row of balusters or posts that support it, as along the front of a gallery.

A newel or a newel post is a post supporting one end of a handrail at the top or bottom of a flight of stairs. A newel is a central pillar or upright from which the steps of a winding stair radiate. A newel can be a vertical support at the center of a circular staircase. A newel can be a post that supports a handrail at the bottom or at the landing of a staircase. There are standard newells, double newells, and box newells.

A banister is defined as a handrail, especially a hand rail on a staircase. A banister is also defined as a handrail together with its supporting structures. A banister can also refer to one of the vertical supports of a handrail, such as a baluster.

Spindle has many definitions. A spindle can be a rounded rod, usually of wood, tapering toward each end. A spindle can be used in hand-spinning to twist into thread the fibers drawn from the mass on the distaff, and on which the thread is wound as it is spun. A spindle can be a vertical shaft that serves to center a phonograph record on a turntable.

SUMMARY OF THE INVENTION

A feature of the invention is the provision in a barrier for a residential passageway, of a stairway post adapter apparatus for engaging a stairway post such that the barrier can be engaged at or near the top of a staircase or at or near the bottom of a staircase, where the staircase may employ stairway posts such as balusters, newels, banisters, and spindles.

Another feature of the present invention is the provision in a stairway post adapter apparatus for engaging a stairway post having a height, of an elongate member for confronting the stairway post along the height of the stairway post, of an upper adapter for being disposed between the elongate member and the stairway post, with the upper adapter having a first portion that confronts the elongate member and a second portion that confronts the stairway post, of an upper strap that wraps about the elongate member, upper adapter and stairway post for drawing the elongate member, upper adapter, and stairway post relatively together to pinch the upper adapter therebetween, of a lower adapter for being disposed between the elongate member and the stairway post, with the lower adapter having a first portion that confronts the elongate member and a second portion that confronts the stairway post, and of a lower strap that wraps about the elongate member, lower adapter and stairway post for drawing the elongate member, lower adapter, and stairway post relatively together to pinch the lower adapter therebetween such that each of the upper and lower adapters can be disposed between the elongate member and the stairway post where the upper and lower adapters are fixed in place by the straps such that the elongate member is engaged to the stairway post without harming the stairway post and such that in turn a predefined object can be engaged to the elongate member.

Another feature of the present invention is the provision in such a stairway post adapter apparatus, of at least one of the upper and lower adapters including an outer side that confronts the stairway post and an inner side opposite of the outer side, of the outer side including a first longitudinally extending receiver for receiving therein a portion of the stairway post, and of the first longitudinally extending receiver extending from one end of the at least one upper and lower adapter to the other end of the at least one of the upper and lower adapter.

Another feature of the present invention is the provision in such a stairway post adapter apparatus, of at least one upper and lower adapter including an outer side that confronts the stairway post and an inner side opposite of the outer side, of the inner side including a second longitudinally extending receiver for receiving therein a portion of the elongate member, and of the second longitudinally extending receiver extending from one end of the at least one upper and lower adapter to the other end of the upper and lower adapter.

Another feature of the present invention is the provision in such a stairway post adapter apparatus, of at least one of the upper and lower adapters including a horizontally running channel formed therein for engaging the strap, with the at least one upper and lower adapter further including a vertically running channel formed therein for receiving the elongate member, with the horizontally running channel and vertically running channel being in communication with each other.

Another feature of the present invention is the provision in a barrier for a residential passageway, of a right upper eyelet and a right lower eyelet, with the right upper and lower eyelets being engaged to a right base in the residential passageway, of a left upper eyelet and a left lower eyelet, with the left upper and lower eyelets being engaged to a left base in the residential passageway that opposes the right base in the residential passageway, of a right gate portion engaged to the right upper and lower eyelets, of a left gate portion engaged to the left upper and lower eyelets, with the right gate portion slidingly engaged to the left gate portion such that a total length of the right and left gate portions can be slidingly increased and slidingly decreased, of a left upper pin engaged to the left gate portion for engaging the left upper eyelet, with the left upper pin including a head, of a left lower pin engaged to the left gate portion for engaging the left lower eyelet, with the left lower pin including a head, of one of the left upper pin and left lower pin including a stop, of the eyelet corresponding to the one of the left upper pin and left lower pin being engaged between the stop and the head corresponding to the one of the left upper pin and left lower pin, of a right upper pin engaged to the right gate portion for engaging the right upper eyelet, with the right upper pin having a head and a free end, and of a right lower pin engaged to the right gate portion for engaging the right lower eyelet, with the right lower pin including a head and a free end.

Another feature of the present invention is the provision in a barrier for a residential passageway, of a set of jaws swingably engaged to the right gate portion, with the set of jaws when closed confronting the upper pin of the right gate portion between the head and free end of the right upper pin, with the right upper eyelet being disposed between the head of the right upper pin and the set of jaws when the set of jaws is closed, with the set of jaws when open being disposed apart from each other by a distance greater than a width of the right upper eyelet such that the jaws can be lifted up and over the right upper eyelet, such that the right upper pin can be removed from the right upper eyelet when the jaws are opened, and such that when the jaws are opened the gate portions can be lifted up such that the right upper and lower pins can be disengaged from the right upper and lower eyelets and such that the gate portions can be swung as a whole via the left upper and lower pins of the left gate portion so as to open the barrier.

Another feature of the present invention is the provision in a barrier for a residential passageway, of the stop and the corresponding head being spaced from each other by a first distance, of the head and free end of the right upper pin being spaced from each other by a second distance, of the head and free end of the right lower pin being spaced from each other by a third distance, of the second distance being less than the first distance, of the third distance being less than the first distance, such that free ends of the right gate portion clear the right upper and lower eyelets prior to the stop hitting the eyelet corresponding to the stop.

Another feature of the present invention is the provision in a barrier for a residential passageway, of the right base being an elongate member and of the left base being an elongate member, of each of the right and left bases including a top portion, of the top portion including a bubble level, with the bubble level including a bubble in liquid and a circle marked on the bubble level such that, when the bubble is centered in the circle, then the elongate member is oriented at a true vertical position.

Another feature of the present invention is the provision in a barrier for a residential passageway, of a first gate base for being engaged to the stairway post of the residential passageway, of a second gate base for being engaged to a second vertical surface of the residential passageway that is opposite of the stairway post, of a gate engaged to and between the first and second gate bases, of an upper adapter for being disposed between the first gate base and the stairway post, with the upper adapter having a first portion that confronts the first gate base and a second portion that confronts the stairway post, of a lower adapter for being disposed between the first gate base and the stairway post, with the lower adapter having a first portion that confronts the first gate base and a second portion that confronts the stairway post, of an upper strap that wraps about the first gate base, upper adapter and stairway post for drawing the first gate base, upper adapter, and stairway post relatively together to pinch the upper adapter therebetween, of a lower strap that wraps about the first gate base, lower adapter and stairway post for drawing the first gate base, lower adapter, and stairway post relatively together to pinch the lower adapter therebetween, of the first gate base including a first upper eyelet and a second lower eyelet, of the second gate base including a third upper eyelet and a fourth lower eyelet, of the gate including first, second, third and fourth pins for respectively engaging the first, second, third and fourth eyelets, of the first and second pins being of lesser length than the third and fourth pins such that the first and second pins clear their respective first and second eyelets prior to when the third and fourth pins clear their respective third and fourth eyelets when the gate is lifted off the first, second, third and fourth eyelets such that only one end of the gate needs to be disengaged from its respective gate base such that the gate is swingably openable.

Another feature of the invention is the provision in a baluster adapter, of an elongate member for confronting a baluster, of an upper two-piece slide slideable on the elongate member, with the upper two-piece slide having a first piece that engages the elongate member and confronts the baluster, a second piece that confronts the baluster, and a strap that wraps about the first and second pieces of the upper two-piece slide for drawing the first and second pieces of the upper two-piece slide together to pinch the baluster therebetween.

Another feature of the invention is the provision in a baluster adapter, of a lower two-piece slide slideable on the elongate member, with the lower two-piece slide having a first piece that engages the elongate member and confronts the baluster, a second piece that confronts the baluster, and a strap that wraps about the first and second pieces of the lower two-piece slide for drawing the first and second pieces of the lower two-piece slide together to pinch the baluster therebetween.

Another feature of the invention is the provision in a baluster adapter, of the first piece of the upper two-piece slide including a curved recess that confronts the baluster, with the curved recess having an axis that extends generally parallel to an axis of the elongate member.

Another feature of the invention is the provision in a baluster adapter, of the second piece of the upper two-piece slide including a curved recess that confronts the baluster, with the curved recess having an axis that extends generally parallel to an axis of the elongate member.

Another feature of the invention is the provision in a baluster adapter, of the first piece of the lower two-piece slide having a set of three sidewalls running generally parallel to an axis of the elongate member and forming generally the shape of a U.

Another feature of the invention is the provision in a baluster adapter, of the second piece of the lower two-piece slide having a right angled recess that confronts and receives the baluster, with the right angled recess having a pair of sidewalls extending at a right angle to each other and running generally parallel to an axis of the elongate member.

Another feature of the invention is the provision in a baluster adapter, of the second piece of the lower two-piece slide having a set of two right angled recesses for confronting and receiving the baluster, with each of the right angled recesses having a pair of sidewalls extending at a right angle to each other and running generally parallel to an axis of the elongate member, with the two right angled recesses defining a first width.

Another feature of the invention is the provision in a baluster adapter, of the second piece of the lower two-piece slide having a set of four right angled recesses for confronting and receiving the baluster, with each of the right angled recesses having a pair of sidewalls extending at a right angle to each other and running generally parallel to an axis of the elongate member, with two of the set of four right angled recesses defining a first width, with another two of the set of four right angled recesses defining a second width, and with two of the set of four right angled recesses receiving the baluster at any one time.

Another feature of the invention is the provision in a baluster adapter, of the first piece of the upper two-piece slide including a through opening through which the elongate member is received.

Another feature of the invention is the provision in a baluster adapter, of the elongate member including an outer side that confronts the baluster and an inner side opposite of the outer side, wherein the outer side includes a longitudinally extending receiver for receiving therein a portion of the baluster, with the longitudinally extending receiver extending from one end of the elongate member to the other end of the elongate member.

Another feature of the invention is the provision in a baluster adapter, of the receiver of the baluster adapter having a set of four right angled recesses for confronting and receiving the baluster, with each of the right angled recesses having a pair of sidewalls extending at a right angle to each other and running generally parallel to an axis of the elongate member, with two of the set of four right angled recesses defining a first width, with another two of the set of four right angled recesses defining a second width, and with two of the set of four right angled recesses receiving the baluster at any one time.

Another feature of the invention is the provision in a barrier for a residential passageway, of a first upright elongate member having an upper eyelet and a lower eyelet, with the first upright elongate member engagable to a portion of the residential passageway, of a second upright elongate member having an upper eyelet and a lower eyelet, with the second upright elongate member engagable to a portion of the residential passageway.

Another feature of the invention is the provision in a barrier for a residential passageway, of a first gate portion engaged to the first upright elongate member, of a second gate portion engaged to the second upright elongate member, with the second gate portion slidingly engaged to the first gate portion such that a total length of the first and second gate portions can be slidingly increased and slidingly decreased.

Another feature of the invention is the provision in a barrier for a residential passageway, of an upper pin engaged to the first gate portion for engaging the upper eyelet of the first upright elongate member, with the upper pin having a head and a stop, with the upper eyelet of the first upright elongate member being engaged between the head and the stop, of a lower pin engaged to the first gate portion for engaging the lower eyelet of the first upright elongate member, with the lower pin having a head and a stop, with the upper eyelet of the first upright elongate member being engaged between the head and the stop, of an upper pin engaged to the second gate portion for engaging the upper eyelet of the second upright elongate member, with the upper pin having a head and a free end, of a lower pin engaged to the second gate portion for engaging the lower eyelet of the second upright elongate member, with the lower pin having a head and a free end.

Another feature of the invention is the provision in a barrier for a residential passageway, of a set of jaws swingably engaged to the second gate portion, with the set of jaws when closed confronting the upper pin of the second gate portion between the head and free end of the upper pin, with the upper eyelet of the second elongate member between disposed between the head of the upper pin of the second gate portion and the set of jaws when the set of jaws is closed, with the set of jaws when open being disposed apart from each other by a distance greater than a width of the eyelet such that the jaws can be lifted up over the eyelet, such that the upper pin of the second gate portion can be removed from the eyelet of the second elongate member when the jaws are opened, and such that when the jaws are opened the gate portions can be lifted up such that the upper and lower pins of the second gate portion can be disengaged from the upper and lower eyelets and such that the gate portions can be swung via the upper and lower pins of the first gate portion so as to open the barrier.

Another feature of the invention is the provision in a baluster adapter, of an elongate member for confronting the baluster along a height of the baluster, of a gate engaged to the elongate member and having two slideable portions such that a total length of the gate can be slidingly increased and slidingly decreased, of an upper two-piece slide slideable on the elongate member, with the upper two-piece slide having a first piece that engages the elongate member and confronts the baluster, a second piece that confronts the baluster, and a strap that wraps about the first and second pieces of the upper two-piece slide for drawing the first and second pieces of the upper two-piece slide together to pinch the baluster therebetween, and of a lower two-piece slide slideable on the elongate member, with the lower two-piece slide having a first piece that engages the elongate member and confronts the baluster, a second piece that confronts the baluster, and a strap that wraps about the first and second pieces of the lower two-piece slide for drawing the first and second pieces of the lower two-piece slide together to pinch the baluster therebetween such that each of the upper and lower two-piece slides can slide up and down the elongate member to a desired location on the baluster where the upper and lower slides are fixed in place by the straps such that the elongate member is engaged to the baluster without harming the baluster and such that the gate can be engaged to the elongate member.

An advantage of the present invention is that the present barrier having a gate may be engaged to a baluster that is ornamental, structural and functional, without harming the ornamental, structural or functional features of the baluster. One feature contributing to this advantage is the slide that can be slid up and down each of the elongate member and baluster to a desired location. Another feature contributing to this advantage is that the slide can be broken down into two pieces, permitting curved or right angled interiors to be placed about the curved or right angled shape of a baluster. Another feature contributing to this advantage is the elongate member that confronts the baluster along the height of the baluster and includes a receiver running from the bottom end to the top end to receive therein portions of the baluster. Another feature contributing to this advantage is that each of the adapters may be formed of a resilient material. Another feature contributing to this advantage is that an adapter may have a vertically running receiver for the elongate member, a vertically running receiver for the stairway post, and a horizontally running receiver for a strap to pinch the adapter between the elongate member and the stairway post.

Another advantage of the present invention is that the present barrier having a gate is reversible. One feature contributing to this advantage is the eyelet structure, a structure that is repeated at four locations. The eyelet may be engaged to a baluster adapter or engaged directly to a wall of a residential passageway or engaged to another structure in a residence. Another feature contributing to this advantage is the pin structure, a structure that is repeated at four locations such that any of the upper pins can engage any of the upper eyelets and such that any of the lower pins can engage any of the lower eyelets.

Another advantage of the present invention is that the present barrier having a gate may easily fit unique passageway widths found in different residences. Two features contributing to this advantage are the two gate portions that slide in planes adjacent and parallel to each other such that the gate as a whole is extendable and retractable in length.

Another advantage of the present invention is that there is a double safety action. To open the gate, two courses of action must be taken. First, the jaws of the latch must be pinched open. Second, the gate as a whole must be lifted up to lift the latch side pins out of their respective eyelets. This two step course of action minimizes chances that younger children will be able to open the gate.

Another advantage of the present invention is that many of the parts are identical or have similar features. This advantage minimizes the cost of manufacture and lends simplicity to set up and operation. For example, two gate panels or portions are identical, the four gate cradles or saddles are identical, the four eyelet bases having the eyelets are identical, the two pin apparatus of the hinge or swing side of the gate have similar features, and the two pin apparatus of the latch side of the gate have similar features.

DETAILED DESCRIPTION

FIGS. 1A to 1H and 2A to 2H show various types of balusters or stairway posts. Reference number 10 indicates such a baluster or stairway post. Stairway post 10 as used herein can refer to a baluster, newel, standard newel, box newel, double newel, banister, balustrade, or spindle that makes up part of a stairway and that is a vertically running post.

Figure 1A:
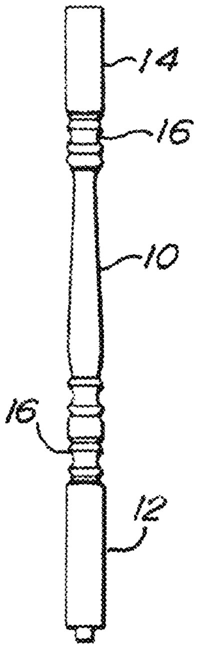
Fig. 1A (PRIOR ART)
FIGS. 1A to 1H are side views of various types of balusters or stairway posts.
Figure 1B:
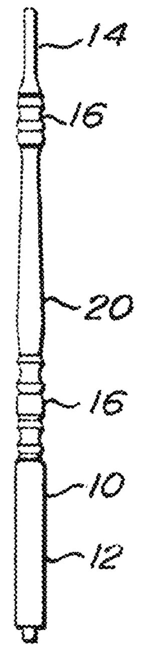
Fig. 1B (PRIOR ART)
Figure 1C:
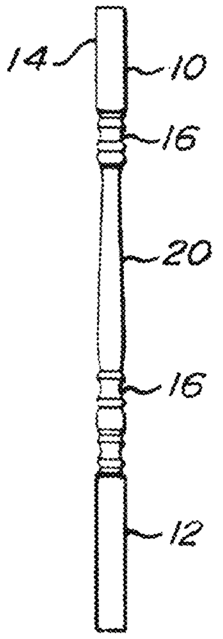
Fig. 1C (PRIOR ART)
Figure 1D:
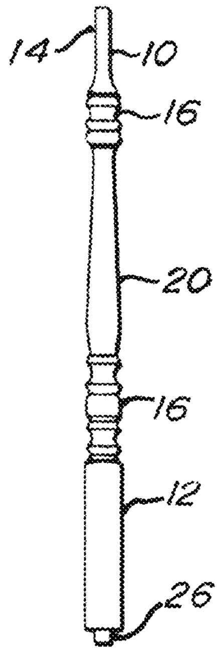
Fig. 1D (PRIOR ART)
Figure 1E:
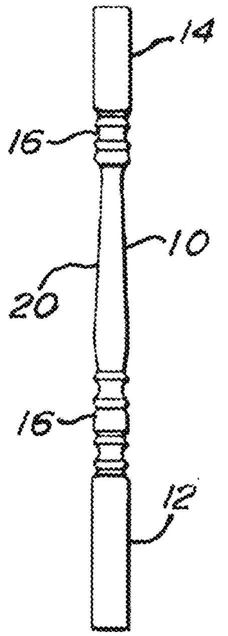
Fig. 1E (PRIOR ART)
Figure 1F:
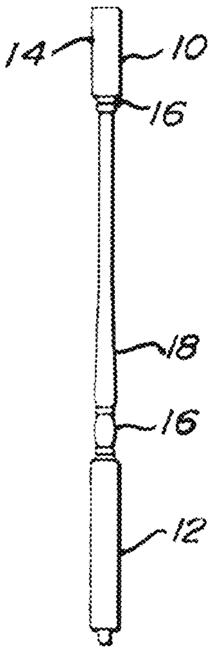
Fig. 1F (PRIOR ART)
Figure 1G:
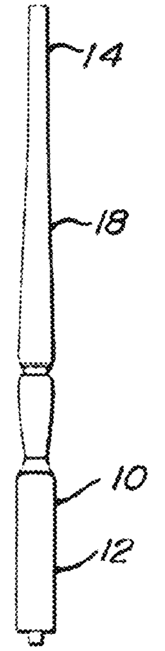
Fig. 1G (PRIOR ART)
Figure 1H:
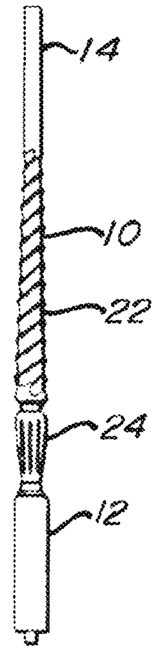
Fig. 1H (PRIOR ART)
Figure 2A:
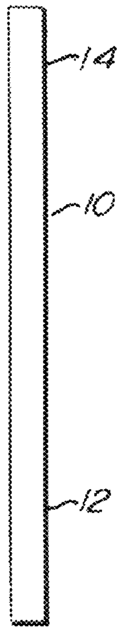
Fig. 2A (PRIOR ART)
FIGS. 2A to 2H are side views of various types of balusters or stairway posts.
Figure 2B:
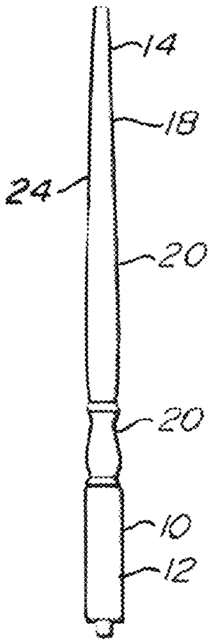
Fig. 2B (PRIOR ART)
Figure 2C:
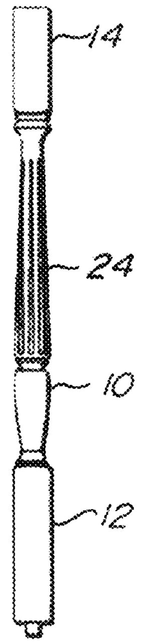
Fig. 2C (PRIOR ART)
Figure 2D:
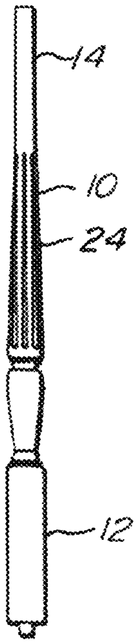
Fig. 2D (PRIOR ART)
Figure 2E:
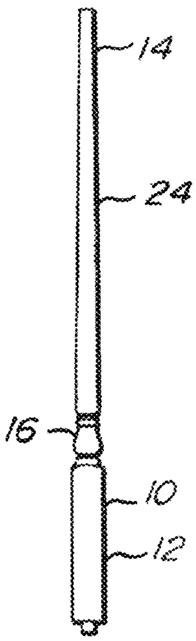
Fig. 2E (PRIOR ART)
Figure 2F:
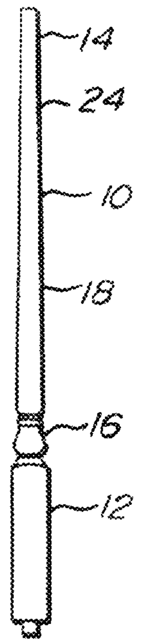
Fig. 2F (PRIOR ART)
Figure 2G:
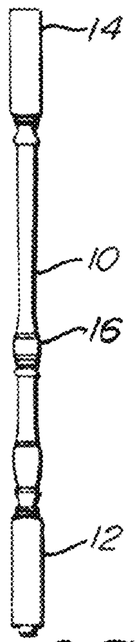
Fig. 2G (PRIOR ART)
Figure 2H:
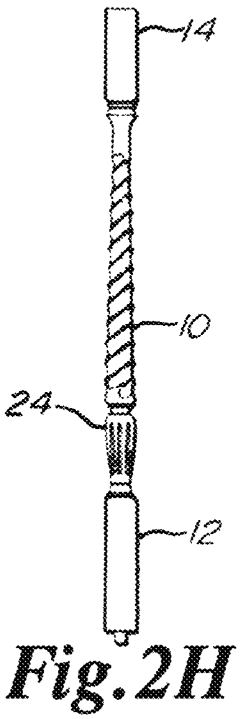
Fig. 2H (PRIOR ART)

Stairway post 10 can include a bottom portion 12. Bottom portion 12 may have a cylindrical outer surface or may be square in section. Stairway post 10 can include an upper portion 14. Upper portion 14 may have a cylindrical outer surface or be square in section. Stairway post 10 can have a portion 16 with multiple swellings or two or more multiple swelling portions 16. Stairway post 10 can have a portion 18 that is frustoconical (i.e., forms a portion of a cone). Stairway post 10 can have a portion 20 that is vase-shaped. Stairway post 10 can have a portion 22 that is helical. Stairway post 10 can have portions 24 that taper, and its should be noted that the frustoconical portion 18 also tapers, that vase-shaped portion 20 can have two or more tapering portions, and that helical portion 22 has a helical feature as well as a tapering feature. Stairway post 10 may have an engraved portion 24 that includes channels running vertically. FIG. 2A shows that a stairway post 10 may be continuously circular or continuously square in section from its bottom end to its top end and have the same width or same diameter from its bottom end to its top end. Stairway post 10 may include an end having a coaxial downwardly extending extension or plug 26, of lesser diameter or of lesser width than the bottom portion 12 of post 10, to mate with an opening in a floor or stairway support piece.

Figure 3A:
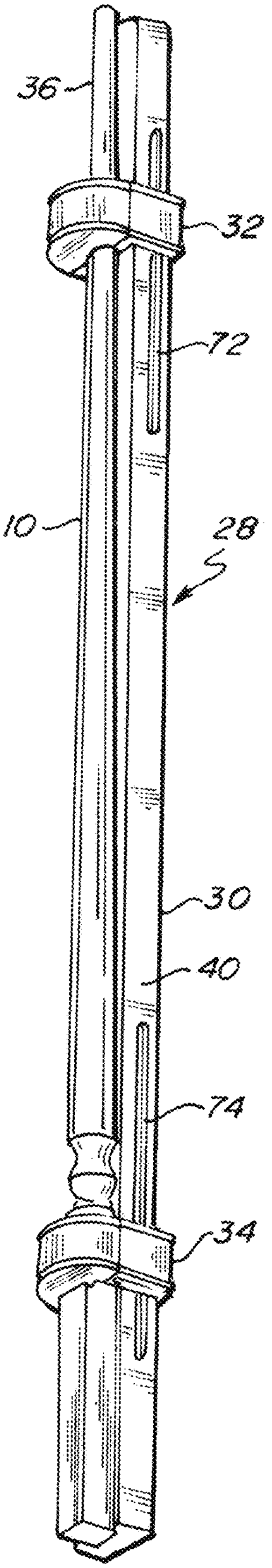
FIG. 3A is a perspective view of the present universal baluster adapter engaged to a baluster.
Figure 3B:
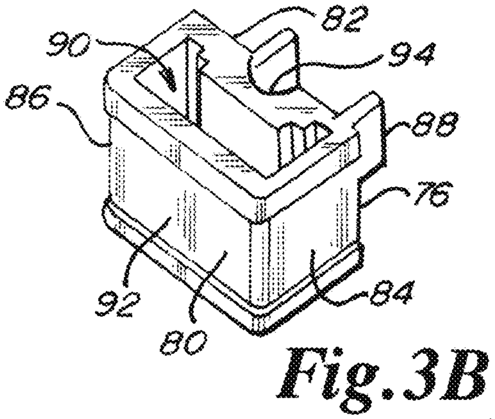
FIG. 3B is a perspective view of one piece of the upper two-piece slide of the universal baluster adapter of FIG. 3A.
Figure 3C:
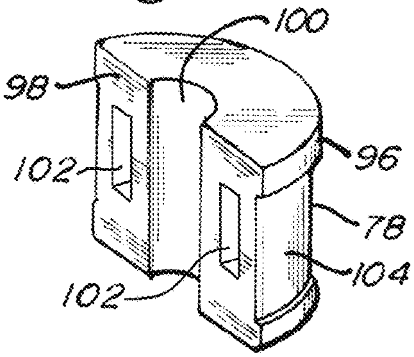
FIG. 3C is a perspective view of the other piece of the upper two-piece slide of the universal baluster adapter of FIG. 3A.
Figure 3D:
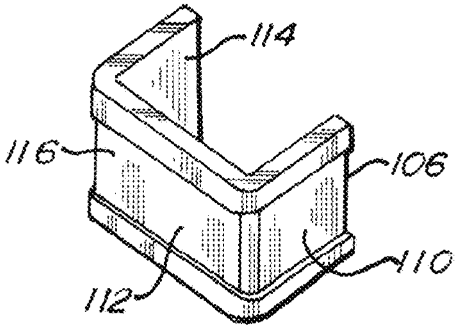
FIG. 3D is a perspective view of one piece of the lower two-piece slide of the universal baluster adapter of FIG. 3A.
Figure 3E:
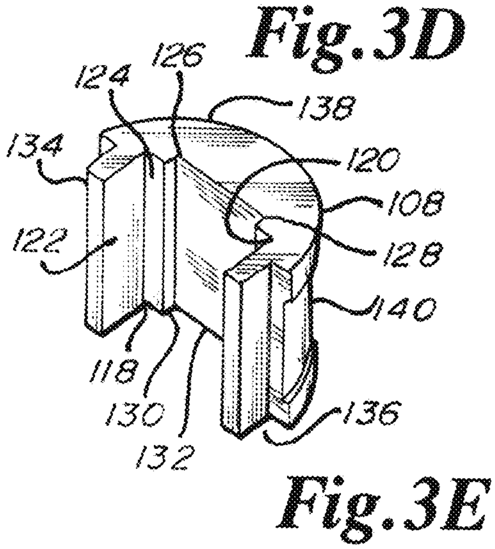
FIG. 3E is a perspective view of the other piece of the lower two-piece slide of the universal baluster adapter of FIG. 3A.
Figure 4:
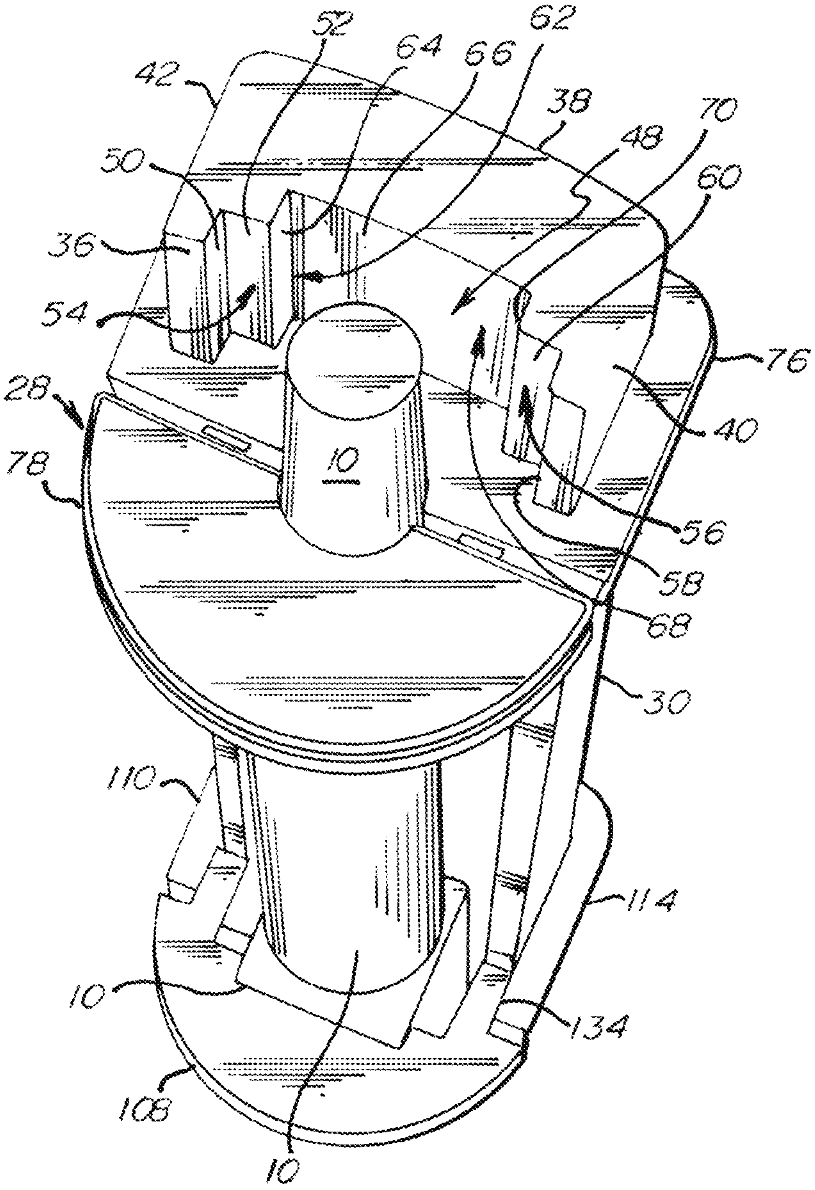
FIG. 4 is a perspective view from the top of the universal baluster adapter of FIG. 3A.

FIG. 3A and FIG. 4 show a universal stairway post adapter 28 that includes an elongate member 30 that confronts the stairway post 10 along the height of the stairway post, an upper two-piece slide 32 that is slideable axially or vertically along the elongate member 30, and a lower two-piece slide 34 that is slideable axially or vertically along the elongate member 30. Each of the upper and lower two-piece slides 32, 34 can be formed of a rubber, resilient, soft, or elastomeric material, that may be of a plastic or silicone, so as to minimize damage to stairway posts 10 when the slides 32, 34 make contact with and are drawn tightly against the stairway posts 10. The rubber, resilient, soft, or elastomeric material also provides a better fit to an irregular portion of a stairway post 10.

Elongate member 30 includes a height approximately equal to a stairway post. Elongate member 30 can be manufactured in different heights or can include extensions where the extensions are coaxial with elongate member 30. Elongate member 30 is preferably formed of plastic and can be molded or extruded.

Elongate member 30 includes an outer side 36 that confronts the stairway post 10, an inner side 38 opposite of the outer side 36, and a pair of slotted, face sides 40, 42 running between the outer side 36 and inner side 38. Inner side 38 is generally flat or planar, but may have a pair of elliptical shallow depressions formed therein to mark the placement of elliptical bases 44 having eyelets 46. Outer side 36 includes a longitudinally extending receiver 48 for receiving therein a portion, such as a longitudinally extending portion, of stairway post 10. Longitudinal receiver 48 extends from one end of the elongate member 30 to the other end of the elongate member 30. Longitudinal receiver 48 is open ended. Longitudinal receiver 48 includes a set of four right angle recesses or steps or notches for engaging right angle portions of stairway posts 10. For example, a first notch or recess is formed by sidewalls 50, 52 that run at right angles relative to each other. This first notch is indicated by reference numeral 54. First notch 54 opposes and works in cooperation with a second notch 56. Second notch 56 is formed by sidewalls 58, 60 that run at right angles relative to each other. A third notch 62 is formed by sidewalls 64, 66. Third notch 62 opposes and works in cooperation with a fourth notch 68. Fourth notch 68 is formed by sidewalls 70 and 66.

First and second notches 54, 56 may be set a certain distance apart, or third and fourth notches 62, 68 may be set a certain distance apart, so as to capture, for example, a stairway post bottom portion 12 that is square or rectangular in section. However, the set of first and second notches 54, 56, or the set of third and fourth notches 62, 68, may capture other portions of the stairway post 10 that are square or rectangular in section, such as middle portions or upper portions. Further, the set of first and third notches 54, 62 taper relative to the set of second and fourth notches 56, 68 such that longitudinal receiver 48 can receive portions of the stairway post 10 that are cylindrical, or frustoconical, or helical, or vase-shaped, have multiple swellings, or are engraved. First and third notches 54, 62 make up a first set of steps that lead inwardly, and second and fourth notches 56, 68 make up a second set of steps that lead inwardly toward the first set of steps. Longitudinal receiver 48, including its notches 54, 56, 62 and 68, run the length of the elongate member 30. Notches 54, 56, 62, and 68 run parallel to the axis of the elongate member 30.

As shown in FIG. 3A, elongate member 30 includes an upper through slot 72 and a lower through slot 74. Slots 72, 74 run from side 40 to side 42 and open at sides 40, 42. Slots 72, 74 may receive straps that in turn run about stairway post 10 such that elongate member 30 may be secured to a stairway post 10 with straps and with or without the use of upper and lower two piece slides 32, 34. One strap that may be utilized for slots 72, 74 is a strap having hook and loop fasteners, such as Velcro® fasteners. Another strap that may be utilized is one having a buckle, such as a buckle with an overcenter mechanism such that the strap can be drawn more tightly than a Velcro® strap. Slots 72, 74 are disposed between sidewall 66 and inner side 30 so as not to interfere with the structure of any of the notches 54, 56, 62 and 68. Each of slots 72, 74 has a relatively great length to offer the user a variety of choices as to which portion of the stairway post 10 will best receive the strap. For example, the length of each of the slots 72, 74 may be about 10% to about 30% of the length of the post 10, or more preferably about 15% to about 25% of the length of the post 10.

Upper two-piece slide 32 includes an inner first piece 76 and an outer second piece 78. First piece 76 includes an inner side 80, an outer side 82, and two face sides 84, 86 that run to and between the inner and outer sides 80 and 82. Extending from the outer side or face 82 (relative to elongate member 30) is a pair of tabs 88 that are disposed at a right angle relative to side 82 and that are disposed in a plane that lies parallel to the axis of the elongate member 30. A through opening 90 is formed in the first piece 76. Through opening 90 has a structure that is keyed to or matches the periphery outline or border of elongate member 30. That is, first piece 76 can be placed over either end of elongate member 30 and can be slid up or down or along the length of the elongate member 30 and that, because of its keyed structure, minimally rotates, if any, about elongate member 30. First piece 76 slides with a friction fit along elongate member 30. Through opening 90 includes notches that mate with notches 54, 56, 62 and 68. First piece 76 includes a laterally extending channel 92 formed in the exterior surfaces of face sides 84, 86 and inner side 80 for reception of a flexible strap 93, shown in FIG. 5, which strap is different from the strap intended for use with slots 72, 74. The strap intended for employment in channel 92 wraps about each of first and second pieces 76, 78 and pinches the pieces 76, 78 together to grab the stairway post 10. The strap, such as strap 93, may include a buckle, such as a buckle with an overcenter mechanism such that the strap can be drawn more tightly than a Velcro® strap.

First piece 76 further includes a curved recess 94 for confronting the stairway post 10. The curved recess 94 has an axis that extends parallel to an axis of the through opening 90 and parallel to an axis of the elongate member 30. Curved recess 94 is positioned between the tabs 88 and is positioned centrally and vertically in the outer side 82. Curved recess 94 is cylindrical in shape. First piece 76 is generally rectangular in shape.

Second piece 78 generally takes the shape of a half-cylinder. A horizontal cross-section of the second piece 78 generally takes the shape of a rainbow. Second piece 78 includes a curved or rounded outer side 96 and a planar inner side 98. Inner side or inner face 98 includes as formed therein a curved recess 100. Curved recess 100 has an axis that is coaxial with the curved recess 94 of first piece 76. Curved recess 100 is cylindrical in shape and is positioned centrally and vertically in inner side 98. Inner side 98 includes two slots 102 formed therein for reception of tabs 88. Curved recess 100 is positioned between the slots 102. Second piece 78 includes a laterally extending channel 104 formed in the exterior surface of outer side 96, which channel 104 communicates with channel 92 when the first and second pieces 76 and 78 are engaged to each other to define a perimeter for the upper two piece slide 32, even if the first and second pieces 76, 78 are spread apart by a stairway post 10 and do not make full contact with each other. When first and second pieces 76, 78 are engaged to each other with a strap, the top and bottom surfaces of first piece 76 are flush with the respective top and bottom surfaces of second piece 78. It should be noted that when first and second pieces 76, 78 are engaged and pinched toward each other with a strap in channels 92, 104, the outer side 82 of the first piece 76 may or may not make contact with the inner side 98 of the second piece 78. Pieces 76, 78 may be held apart by a relatively large portion of a stairway post 10. In use, first and second pieces 76, 78 may be held together in a relatively loose fashion by a strap while the user slide the first piece 76 up and down the elongate member 30 in an attempt to figure out the optimum placement for the first piece 76, whereupon the user may tighten the strap to tightly draw the pieces 76, 78 together.

Lower two-piece slide 34 includes an inner first piece 106 and an outer second piece 108. First piece 106 includes a set of three sides or sidewalls running generally parallel to an axis of the elongate member 30 and forming generally the shape of a U. Sides 110, 114 are face sides and run parallel to each other. Side 112 runs to and between sides 110, 114 at a right angle to sides 110, 114. A channel 116 for receiving a strap is formed laterally in the exterior surfaces of sides 110, 112, 114. The distance between the interior surfaces of face sides 110, 114 is about equal to the distance between the exterior surface of face sides 40, 42 of elongate member 30 such that first piece 106 can slide with a friction fit longitudinally along elongate member 30 and can remain motionless by itself, without being strapped to second piece 108, at an elevated position solely through the employment of the friction fit. As shown in FIG. 4, the lateral length of side faces 110, 114 is greater than the lateral length of side faces 40, 42 of elongate member 30 such that side faces 110, 114 extend beyond side faces 40, 42 when the first piece 106 is engaged on elongate member 30.

Second piece 108 when on the elongate member 30 is disposed outwardly of inner first piece 106. Whereas first piece 106 is formed to fit the elongate member 30, second piece 108 is formed to fit a stairway post 10. That is, the inside of second piece 108 is formed in the nature of the longitudinal receiver 48 of the elongate member 30. In other words, second piece 108 includes opposing notches 118, 120, where notch 118 is formed by sidewalls 122, 124 and where notch 120 is formed by like sidewalls. Second piece 108 further includes opposing notches 126, 128, where notch 126 is formed by sidewalls 130, 132 and where notch 128 is formed by like sidewalls. Sidewalls 122, 124 run at right angles relative to each other. Sidewalls 130, 132 run at right angles relative to each other. Notches 118, 120 catch corners of a square or rectangular section of a stairway post 10. Notches 126, 128 catch corners of a square or rectangular section of a stairway post 10. Notches 118, 120, 126, 128 and their corresponding sidewalls can also be described as opposing sets of steps that converge or taper towards each other. Notches 118, 120, 126, 128 run parallel to the axis of the elongate member 30 when the lower two piece slide 34 is on the elongate member 30.

Second piece 108 further includes a pair of extensions 134 that extend longitudinally and inwardly to confront the outer side 36 of elongate member 30. Exterior surface of extension 134 forms a recess 136 for receiving sides 110, 114 of first piece 106, as shown in FIG. 4. Second piece 108 further includes a curved or rounded outer side 138 in which is formed a laterally extending channel 140. Channel 140 leads into and communicates with channel 116 of first piece 106 when the pieces 106 and 108 are engaged via a strap such that the communicating channels 116, 140 or strap, such as strap 93, define a perimeter for the lower two piece slide 34 even if the two pieces 106, 108 are spread apart by a post 10 and do not make full contact with each other. First and second pieces 106, 108 may be drawn together by a flexible strap to bite upon a portion of stairway post 10, whereupon the bite may be fixed by securing the strap with hook and loop fasteners, such as Velcro® hook and loop fasteners or with a buckle, such as a buckle with an overcenter mechanism such that the strap can be drawn more tightly than a Velcro® strap. When pieces 106, 108 are drawn together, the upper surfaces of pieces 106, 108 are in a common plane and the lower surfaces of the pieces 106, 108 are in a common plane.

Figure 5:
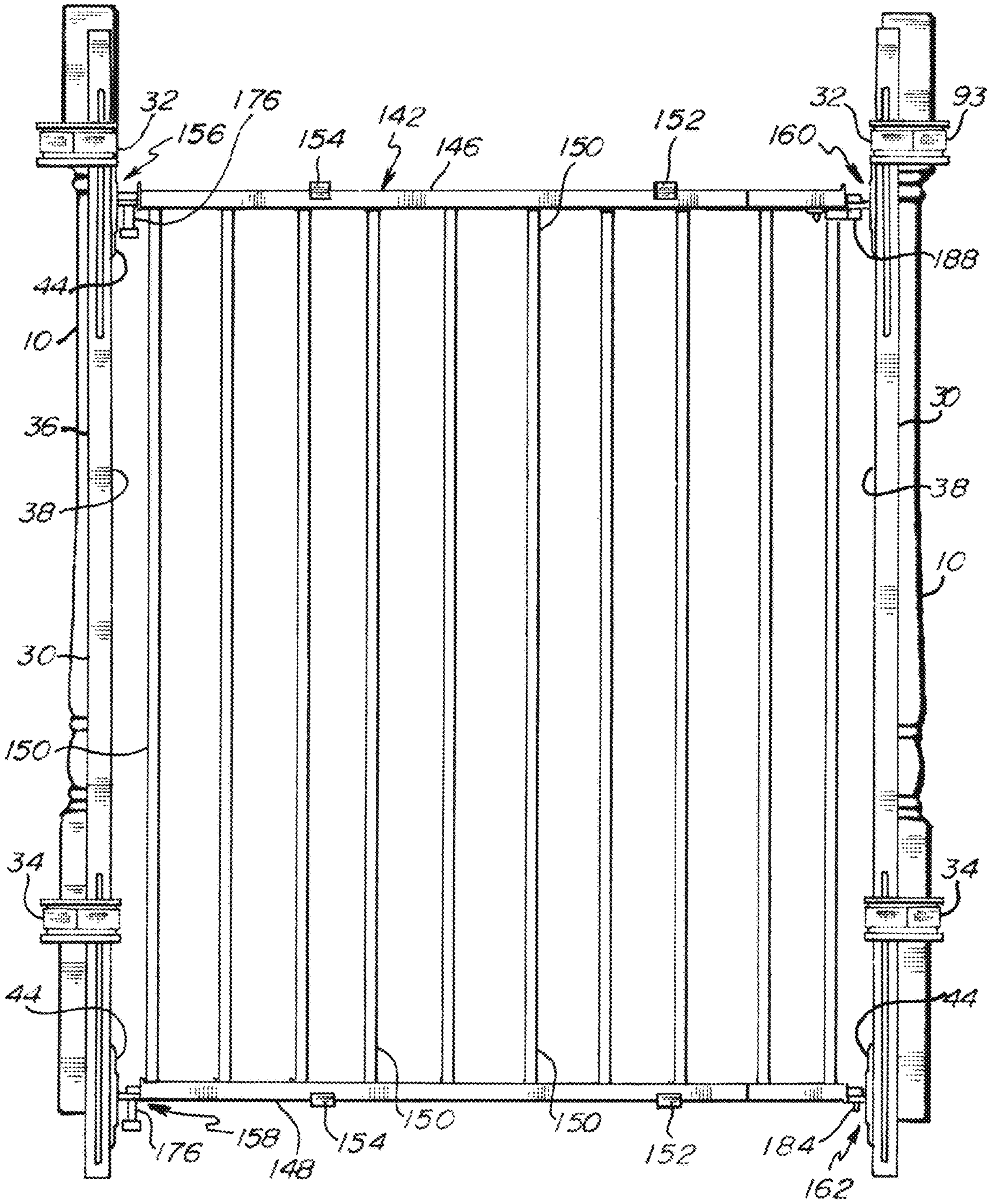
FIG. 5 is a side view of the present reversible and extendable gate engaged between two baluster adapters, which in turn are engaged to stairway posts.
Figure 6:
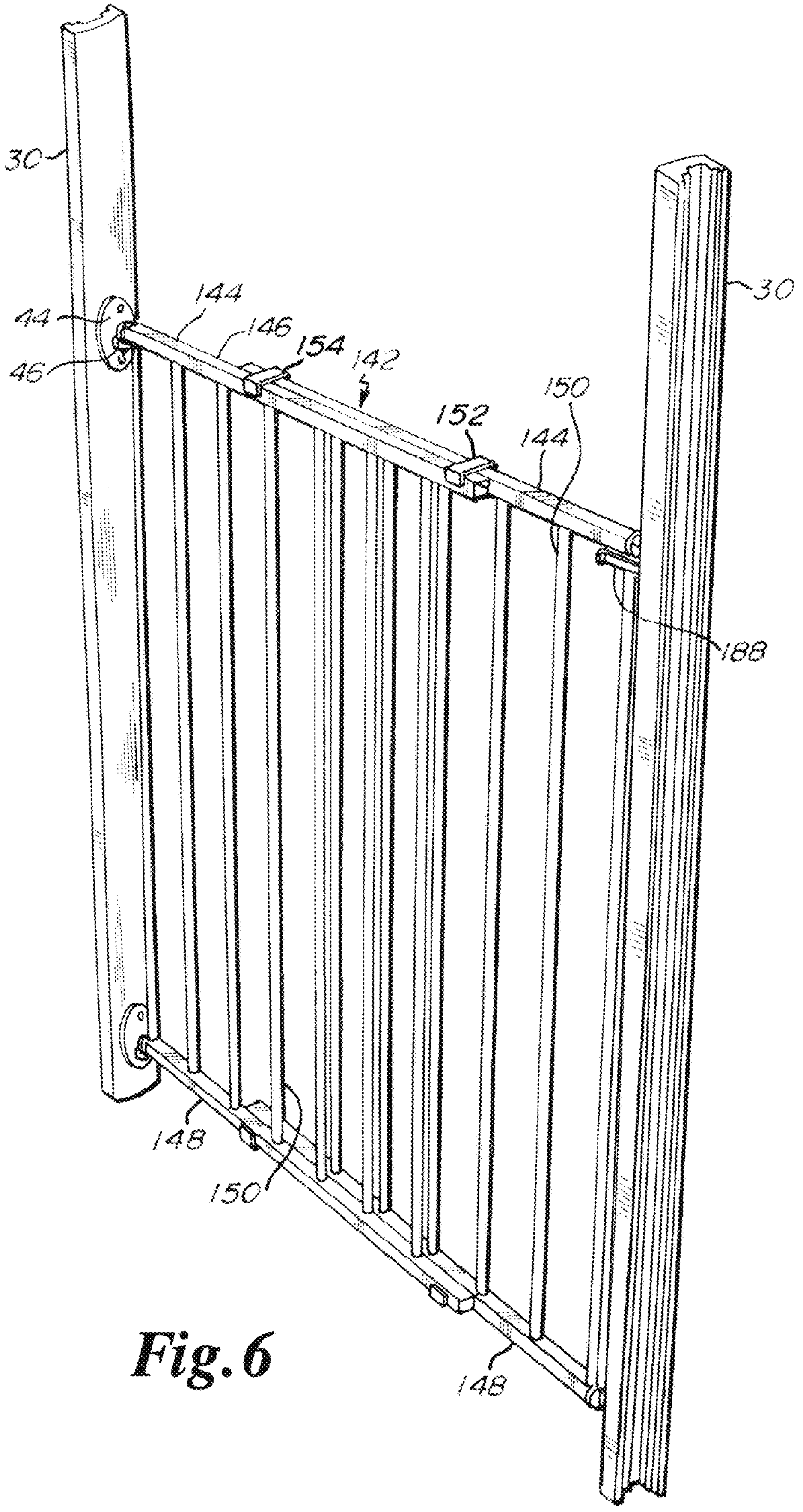
FIG. 6 is a perspective view of the present reversible and extendable gate engaged between two baluster adapters, which remain unengaged to stairway posts.

Utilizing upper two piece slide 32 and lower two piece slide 34, elongate member 30 can be fixed to a stairway post 10 such that elongate member 30 can provide support for another structure such as a gate 142 shown in FIGS. 5 and 6. Gate 142 can also be referred to as a barrier 142 or a residential in home barrier 142. It should be noted that a kit for installing the elongate member 30 to a stairway post 10 may include one or more upper two piece slides 32 and one or more lower two piece slides 34. Upper two piece slides 32 may better engage curved portions of a stairway post 10. Lower two piece slide 34 may better engage square or rectangular portions of a stairway post 10. A kit for installing the elongate member 30 may include a set of four two piece slides 32 that may be installed either on upper or lower portions of a stairway post 10, with slide 32 intended to engage curved portions of a stairway post 10, and with curved portions of a stairway post 10 possibly being at both upper and lower portions of a stairway post 10. A kit for installing the elongate member 30 may also include a set of four two piece slides 34 that may be installed either on upper or lower portions of a stairway post 10, with slide 34 intended to engage square or rectangular portions of a stairway post 10, and with square or rectangular portions of a stairway post 10 possibly being at both upper and lower portions of a stairway post 10.

As shown in FIG. 6, gate 142 includes a pair of gate portions or gate panels 144. Each of the gate portions 144 is engaged to one of the elongate support members 30. Each of the gate portions 144 is also engaged to the other of the gate portions 144. The gate portions 144 are identical to each other. Each of the gate portions 144 includes an upper horizontally extending lateral support member 146. Upper support member 146 is a metal tube. Each of the gate portions 144 includes a lower horizontally extending lateral support member 148. Lower support member 148 is a metal tube. Each of the gate portions 144 includes a set of upright vertically extending longitudinal support members 150. Upright support members 150 are fixed to and between upper and lower support members 146, 148. Upright support members 150 may be tubes or rods. Each of the gate portions 144 is disposed in generally a plane. Upper and lower support members 146, 148 run parallel to each other and upright support member 150 are fixed at right angles to the upper and lower support members 146, 148.

Gate portions 144 are slideably engaged to each other via cradles or saddles 152. Each of the cradles 152 is rigidly fixed, such as by welding, to a lateral support member of one of the gate portions 144 and then extends over to and captures or hooks a confronting lateral support member to capture the other of the gate portion 144 but at the same time permits the slide by type of motion. Each of the gate portions 144 includes a proximal end that confronts the elongate support member 30 and a distal end opposite of the proximal end. At the distal end of gate portion 144, gate portion 144 includes a rigidly affixed cradle 152, and this cradle 152 then extends over to capture, via the lip or hook 154, the other of the support member 146, 148, and this other support member 146, 148 then slides within this cradle 152.

Gate portions 144 are extendable relative to each other to as to block off a relatively wide passageway. Gate portions 144 are retractable relative to each other so as to block off a relatively narrow passageway. The extendibility and retractability of the gate portions 144 is incremental. That is, there are no predefined locations that determine the width of gate 142. In other words, gate portions 144 can fit any passageway with a unique width, as long as the passageway is not too wide and as long as the passageway is not too narrow.

Gate portions 144 are extendable relative to each other until the upper cradles 152 make contact with each other or until the lower cradles 152 make contact with each other, events that happen at about the same time. Gate portions 144 are retractable relative to each other until the distal ends of the upper and lower support members 146, 148 run into or make contact with the opposing elongate support member 30. The opposing elongate support member 30 is the elongate support member 30 to which the support member 146, 148, having such distal end, is not directly connected. It should be noted that the sliding action of the gate portions 144 relative to each other is a friction fit type of sliding action, and the sliding action is placed into play when setting up two elongate support members 30 and one corresponding gate 142. The structure that provides the friction fit type of sliding action is cradle 152, wherein the support member 146, 148 that slides in cradle 152 is held in cradle 152 with a friction fit with lip 154.

Gate 142 is engaged to two elongate support members at four locations 156, 158, 160, 162. Locations 156 and 160 are upper locations. Locations 158 and 162 are lower locations. Locations 156, 158 relate to one gate portion 144 and may be referred to as left locations or hinge side locations. Locations 160, 162 relate to the other gate portion 144 and may be referred to as right locations or latch side locations.

Figure 7A:
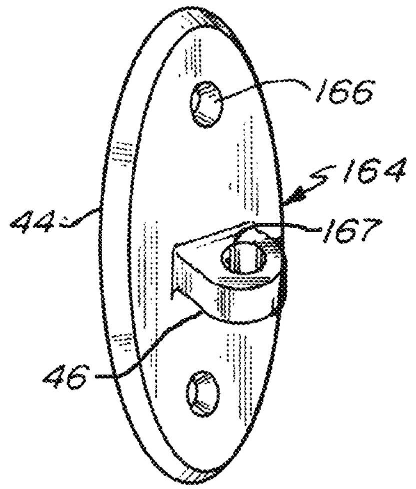
FIG. 7A is a perspective view of an eyelet for the gate of FIG. 5.

At each of the four locations 156, 158, 160, 162, an eyelet apparatus 164 is engaged to elongate support member 30. Eyelet apparatus 164 is shown in FIG. 7A and includes the elliptical base 44 and an eyelet 46. Eyelet apparatus 164 is engaged to elongate support member 30 with pin connectors, such as screws, through pin connector through holes 166 formed in elliptical base 44. As indicated above, elongate support member 30 includes elliptical shallow depressions preformed in inner face or side 38 to maximize the chances that a user will properly align two elongate members 30 with gate 142. Eyelet 46 includes a through hole 167 that has a vertical axis. Eyelet 46 includes an upper surface that is flat and a lower surface that is flat. Eyelet 46 includes a sidewall that, at its distal portion, is curved.

Figure 7B:
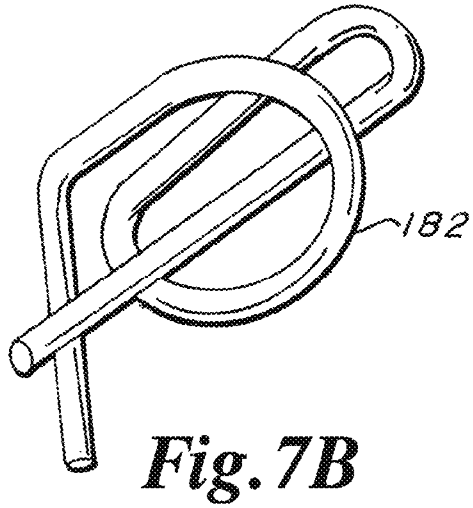
FIG. 7B is a perspective view a rue clip or stop that may replace the cotter pin of FIG. 7C.
Figure 7C:
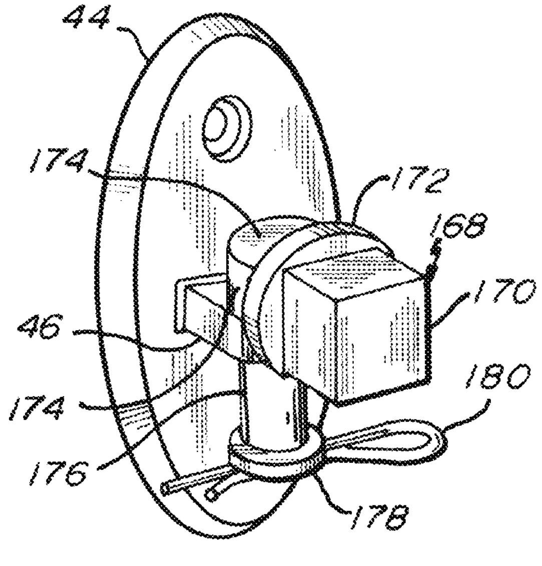
FIG. 7C is a perspective view the nonlatching hinges of the nonlatch side of the gate of FIG. 5, where the hinge includes a cotter pin.
Figure 7D:
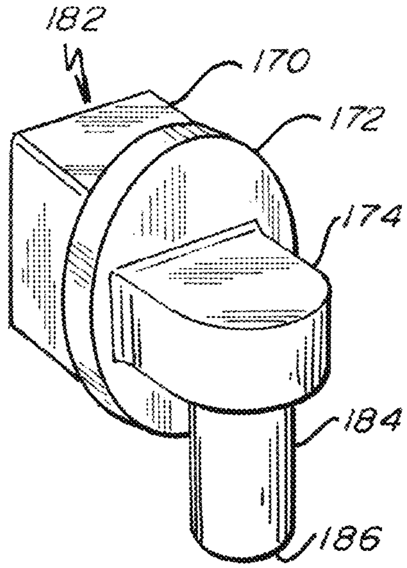
FIG. 7D is a perspective view of the bottom nonlatching hinge of the latch side of the gate of FIG. 5.
Figure 8A:
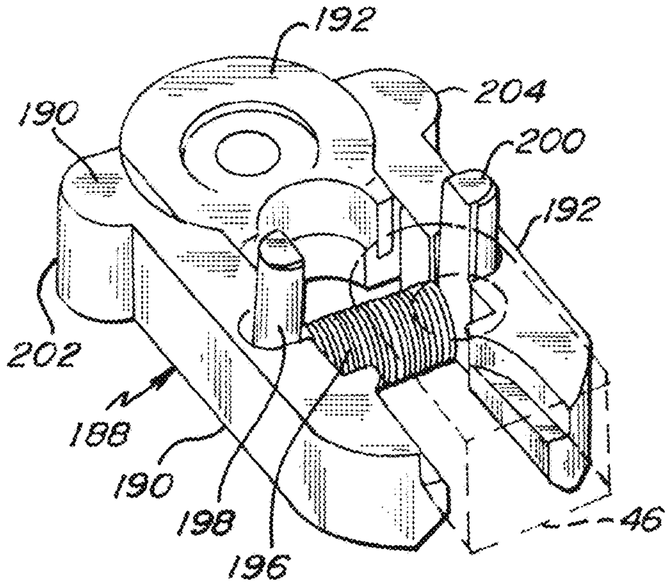
FIG. 8A is a perspective, broken away view of the jawed latch of the gate of FIG. 5, and shows the eyelet that the latch engages in phantom.
Figure 8B:
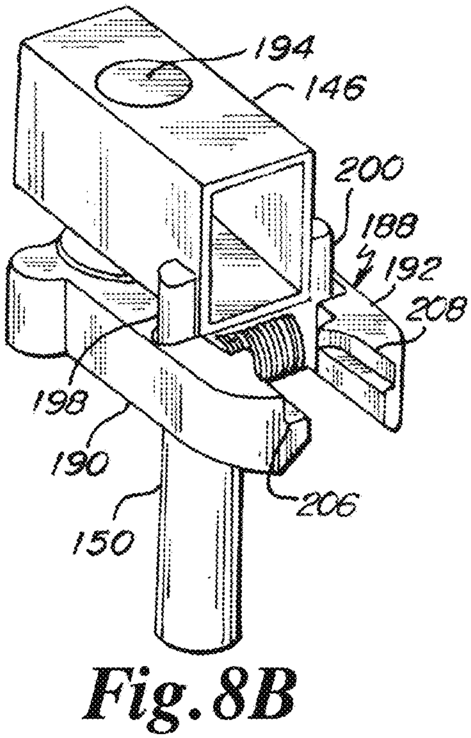
FIG. 8B is a perspective view of the latch of FIG. 8A showing the latch in relation to an upper tube of the gate.
Figure 8C:
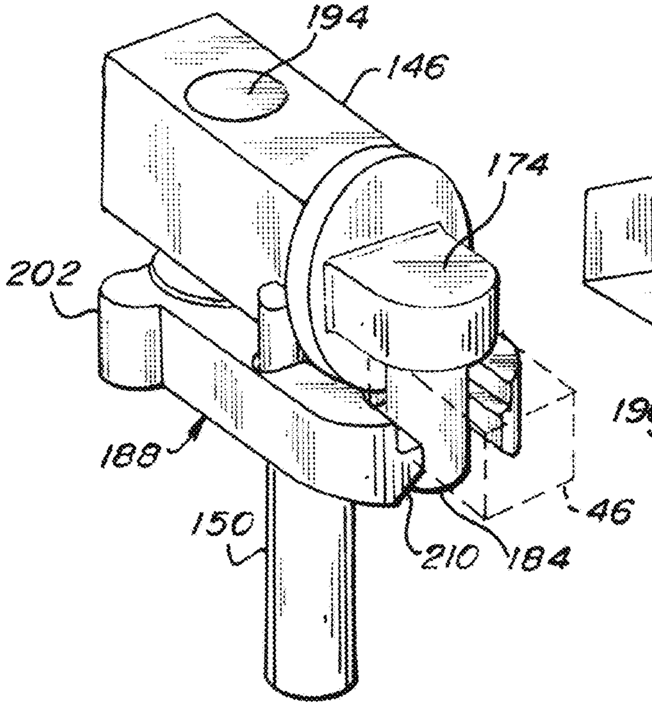
FIG. 8C is a perspective view of the latch of FIG. 8A and shows the pin of the latch engaging the eyelet of FIG. 7A, where the eyelet is shown in phantom.
Figure 8D:
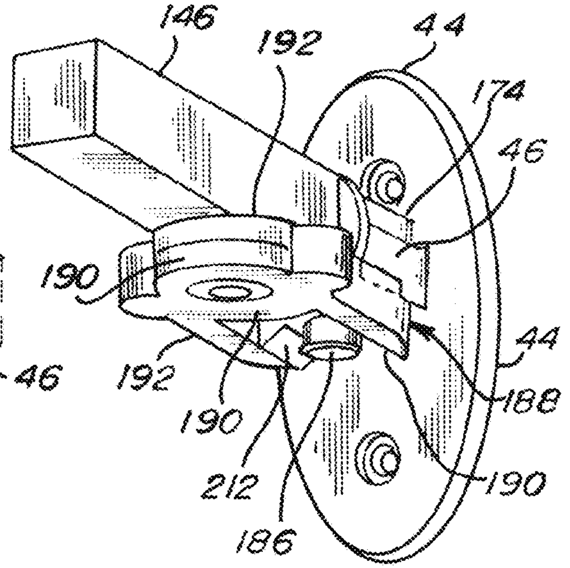
FIG. 8D is a perspective view of the latch of FIG. 8A and shows the latch engaging the eyelet of FIG. 7A.

At locations 156, 158, a pin apparatus 168 is employed. Pin apparatus 168 is shown in FIG. 7C. Pin apparatus 168 includes a plug 170, a cap 172, a head 174, a pin 176, a stop or washer 178, and a lock 180. Plug 170 is inserted into the open distal end of upper and lower support member 146, 148. Plug 170 is square in section and is sized to match the open distal end of upper and lower support member 146. Plug 170 is friction fit into the open distal end of upper and lower support member 146 such that plug 170 can be removed from one end of a support member 146, 148 and placed in the other end of the support member 146, 148. Cap 172 is integral and one-piece with the plug 170. Cap 172 is formed in the shape of a disk, stops the insertion of plug 170 into the open distal end of tube 146, 148, and closes off the open distal end of upper and lower support member 146, 148. Head 174 is the head of pin 176. Head 174 and pin 176 are integral and one-piece with cap 172 and plug 170. Head 174 has a diameter greater than the through hole 167 formed in eyelet 46 such that head 174 will not pass through the through hole 167. Pin 176 is cylindrical in shape and includes a diameter less than the diameter of through hole 167 such that pin 176 is readily passable into and through the through hole 167. At its lower distal end, pin 176 includes a hole extending in a transverse direction, where such transverse direction is generally at a right angle to gate 142 and to the lateral direction in which plug 170 extends. This transversely extending hole receives lock 180. Lock 180 is shown in FIG. 7C as a cotter pin. However, lock 180 may also be a rue clip, such as the rue clip 182 shown in FIG. 7B. Each of the cotter pin 180 and rue clip 182, once inserted, does not come out on its own. It should be noted that the cotter pin 180 and rue clip 182 may double as the stop 178 such that washer 178 is not required. The rue clip 182 especially may double as the stop 178.

Disposed between the lock 180 and the head 174 is a washer or stop 178. Washer 178 includes an outside diameter greater than the diameter of the through hole 167 such that washer 178 will not pass through the eyelet 46. Washer 178 includes an inside diameter greater than the diameter of the pin 176. Lock 180 holds the washer or stop 178 on the pin 176. Head 174 defines a proximal end of the pin 176. Lock 180 defines a distal end of the pin 176. The distance between the proximal and distal ends can be described as distance A. Distance A is a relatively long distance. Distance A specifically is a distance along pin 176 from the upper edge of stop 178 to the lower edge of pin head 174.

Each of locations 160, 162 employs a pin apparatus 182. Pin apparatus 182 includes plug 170, cap 172, head 174, and a pin 184. Pin 184 is cylindrical in shape and has a diameter less than the diameter of the through hole 167 of eyelet 46 such that pin 184 readily passes through the through hole 167 of eyelet 46. Pin 184 includes a flat free distal end 186. Pin 184 includes a distance B that runs from the undersurface of head 174 to the flat distal end 186. Distance A is greater than distance B.

At location 160, a latch 188 having two jaws 190, 192 is employed. Latch 188 is fixed to an end portion of upper member 146 via a vertically or longitudinally extending pin or rivet 194 engaged to upper member 146. Pin or rivet 194 may sandwich between its two ends the upper member 146 and each of the proximal disk end portions of jaws 190, 192. Jaws 190, 192 are engaged to and pivot about a proximal, lower end of pin 194. Jaws 190, 192 are biased inwardly via a coil spring 196. One end of coil spring 196 is engaged to a post or stop 198 of jaw 190 and the other end of coil spring 196 is engaged to a post or stop 200 of jaw 192. Posts or stops or towers or travel limiters 198, 200 are integral and one-piece with their respective jaws 190, 192. Each of the stops 198, 200 includes a flat, vertically extending face that confronts and makes contact with the side faces of upper support member 146. Coil or tension spring 196 is under a bias to draw in the jaws 190, 192 and this drawing in action ceases when the flat faces of the stops 198, 200 hit the side faces of upper support member 146. Proximal ends of jaws 190, 192 include respective protrusions 202, 204 that work in the nature of finger grips. A user opens the latch 188 by a pivoting action, and this pivoting action is initiated by the thumb and forefinger squeezing or pinching against the protrusions 202, 204, so as to rotate the distal ends of the jaws 190 and 192 outwardly and away from each other. At the distal ends of jaws 190, 192, the jaws 190, 192 include a pair of respective recesses 206, 208 for receiving the eyelet 46. These recesses 206, 208 work in the nature of a stop or lock to prevent the upper support member 146, and the gate 142 as a whole, from being lifted upwardly when the jaws 190, 192 are at the rest position, i.e., when the jaws 190, 192 are fully drawn in by coil spring 196. However, once the jaws 190, 192 are pivoted apart from each other, the recesses 206, 208 no longer engage the lower surface of the eyelet 46 and can pass upwardly beyond the eyelet 46.

It should be noted that the proximal end of jaw 192 is journaled to and swings about pin 194, that proximal end of jaw 192 rotates on top of proximal end of jaw 190, and that proximal end of jaw 190 also is journaled to and swings about pin 194. Each of the proximal ends of the jaws 190, 192 includes the shape of a disk, which disks rotate relative to each other, one above the other.

The set of jaws 190, 192 is swingably engaged to one gate portion 144. The set of jaws 190, 192 when closed confront the upper pin 184 between the head 174 and free end 186 of the upper pin 184. The upper eyelet 46 of the elongate member 30 is disposed between the head 174 of the upper pin 184 and the set of jaws 190, 192 when the set of jaws 190, 192 is closed. When open, the jaws 190, 192 are disposed apart from each other by a distance greater than a width of the eyelet 46 such that the jaws 190, 192 can be lifted up over the eyelet 46, such that the upper pin 184 of can be removed from the eyelet 46 when the jaws 190, 192 are opened. When the jaws 190, 192 are opened, the gate portions 144 and the gate 142 as a whole can be lifted up such that said upper and lower pins 184 of one side of the gate 142 (of one gate portion 144) can be disengaged from said upper and lower eyelets 46 of one elongate support member 30 such that the gate portions 144 and gate 142 as a whole can be swung via the upper and lower pins 176 of the other side of the gate 142 (of the other gate portion 144) so as to open the gate 142.

The head 174 and stop 178 of the upper pin 176 of upper support member 146 of one gate portion 144 are spaced from each other by a first distance (distance A). The head 174 and stop 178 of the lower pin 176 of the lower support member 146 are spaced from each other also by this first distance (distance A). The head 174 and free end 186 of the upper pin 184 of the upper support member 146 of the other gate portion are spaced from each other by a second distance (distance B). The head 174 and free end 186 of the lower pin 184 of the lower support member 148 of the other gate portion 144 are spaced from each other by a second distance (distance B). The second distance (distance B) is less than the first distance (distance A) such that free ends 186 of the other gate portion 144 clear the eyelets 46 of its respective upright elongate member 130 prior to the stops 178 of the first gate portion 144 hitting the undersurface of the eyelets 46 of the first upright elongate member 30.

It should be noted that each of the jaws 190, 192 includes a proximal end and a distal end. The proximal ends of the jaws are swingably engaged to one gate portion 144. The distal ends of the jaws 190, 192 when in a closed position confront the upper pin 184 of the upper support member 146 of one gate portion 144. The distal ends of the jaws 190, 192 are biased to be normally in the closed position. The distal ends of the jaws 190, 192 include respective confronting inner surfaces 210, 212. These inner surfaces 210, 212 are beveled such that, when the jaws 190, 192 are dropped on the upper eyelet 46, the upper eyelet 46 hits said beveled inner surfaces 210, 212 to urge the jaws 190, 192 apart and permit the upper pin 184 to be fully received in the upper eyelet 46.

In operation, the site for the gate 142 is selected. The site may have a stairway post 10 as a base for an elongate member 30. The site may have a pair of stairway posts 10 as bases for two elongate members 30. The site may have a wall as a base for an elongate member 30. The site may have opposing walls as bases for two elongate members 30. The site may have a stairway post 10 as one base for one elongate member and a wall as a base for the other elongate member 30. Or there may be other bases for the elongate member 30.

If a base that is selected is a wall, then the eyelet bases 44 may themselves be fixed to the wall with pin connectors running through the through holes 166 formed in the eyelet base 44. Upper and lower eyelet bases 44 are engaged to the wall opposite of, for example, a stairway post 10.

If a base that is selected is a wall, another option is to select an elongate member 30 to fix to the wall such that the elongate member 30 becomes in effect a wall adapter instead of a stairway post adapter. The elongate member 30 is engaged to the wall with pin connectors, such as screws or nails, and the elongate member 30 has preformed through holes for such, where the preformed through holes are formed in upper and lower portions of the elongate member 30 and run to and between the outer and inner sides 36, 38. In the case where an elongate member 30 does not have preformed through holes at appropriate locations, through holes may be drilled in the elongate member 30, which is formed from plastic.

If a base that is selected is a stairway post 10, then a first step may be to slide first piece 76 onto the elongate member 30 to a desired height, then dispose the second piece 78 about the stairway post 10 and engage the tabs 88 of the first piece 76 with the slots 102 of the second piece, and then wrap the strap 93 about the pieces 76, 78 to draw the pieces 76, 78 together. The pieces 76, 78 may be drawn together loosely at first and more tightly as, for example, the lower two piece slide 34 is engaged to the stairway post 10 and adjusted up and down the elongate member 30 and stairway post 10. A second step is then to engage the first piece 106 with the elongate member 30 at the desired height, then dispose the second piece 108 about the stairway post 10, and then wrap the strap 93 about the pieces 106, 108 to draw the pieces 106, 108 together. The pieces 106, 108 may be drawn together loosely at first and more tightly as, for example, the upper two piece slide 32 is further adjusted up and down the elongate member 30 and stairway post 10. Adjustment may be made, for example, on tapering portions, where the slide 32 or 34 may have been wedged too loosely or too tightly in the direction of the increased width, where merely a snug fit is desired.

If a base that is selected is a stairway post 10, it may be that the upper two piece slide 32, the lower two piece slide 34 and the particular stairway post 10 do not provide a firm grounding or a firm base for the elongate member 30 and the associated gate 142. In such a case, one or more straps 93 may be inserted into one or more of the upper and lower slots 72, 74 of the elongate member 30 and then wound about the stairway post 10. If one or more slots 72, 74 are utilized, one or more of the two piece slides 32, 34 may also be employed.

Once the elongate members 30 and/or the eyelet bases 44 have been fixed to their respective bases and have been aligned, or generally aligned, with each other, the gate 142 is set in place between the elongate members 30 and/or elongate bases 44. First, though, it can be mentioned that the elongate member 30 may or may not have the eyelet bases 44 preattached. If not, the eyelet bases 44 can be attached to the elongate members 30 prior to or after the elongate members 30 are engaged to their respective bases.

The gate 142 may be preassembled. If not, gate portions 144 are simply slid together. Then, the gate portion 144 having upper and lower pins 176 may be engaged to corresponding eyelets 46 by dropping the pins 176 into the eyelets 46 and then engaging the washer or stop 178 and the cotter pin 180. Then the other gate portion 144 is slidingly extended until the pins 184 reach their corresponding eyelets 46 attached to the other base. Then the gate 142 is lifted up slightly, such as to where stop 178 hits the underside of eyelet 46, and then the gate 142 is let down such that the pins 184 drop down into their corresponding eyelets 46. As the gate 142 is let down, the jaws 190, 192 will be urged apart by virtue of the beveled surfaces 210, 212 hitting the pin heads 174 of the pins 184, whereupon the jaws 190, 192 will be drawn closed beneath eyelet 46 to lock the gate 142 to and between the respective bases.

To open the gate 142, the protrusions 202, 204 are spun rearwardly by, for example, a pinching action of the thumb and forefinger upon the knobs or protrusions 202, 204, whereupon the distal ends of the jaws 190, 192 will be drawn apart such that the jaws 190, 192 can pass upwardly beyond eyelet 46, whereupon both pins 184 are lifted out of their respective eyelets 46, and whereupon the gate 142 can swing open by virtue of the pins 176 remaining in their respective eyelets 46. It should be noted that the opening, lifting, and swinging of the gate 142 can be a one hand operation since the jaws 190, 192 and latch 188 are tied in structurally to the upper member 146. Thus, the same hand that pinches the knobs 202, 204 applies a lifting and swinging action to the gate 142. Once the gate 142 is swung open, the user can walk through the present reversible, extendable gate with baluster adapter. Since the gate portions 144 are friction fit, gate portions 144 stay together as one piece and do not automatically extend or retract. However, if desired at this time, gate portions 144 may be hand slid so as to manually extend or retract the gate portions 144 relative to each other.

To close the gate 142, the gate 142 is lifted up slightly, such as to where stop 178 hits the underside of eyelet 46, and then the gate 142 is let down such that the pins 184 drop down into their corresponding eyelets 46. As the gate 142 is let down, the jaws 190, 192 will be urged apart by virtue of the beveled surfaces 210, 212 hitting the pin heads 174 of the pins 184, whereupon the jaws 190, 192 will be drawn closed beneath eyelet 46 to lock the gate 142 to and between the respective bases. The tension spring 196 draws the jaws 190, 192 closed, and one or more features stop the closing of the jaws 190, 192, with such features being the posts or travel limiters 198 hitting the sides of upper support member 146 and the sides of the recess 208 hitting the sides of the eyelet 46.

To reverse the gate 142 means to have the hinged side, i.e., the side having pins 176, stop 178, and lock 180, change locations with the latch side, i.e., the side having pins 184, free ends 186, and latch 188. This can be accomplished because, for one reason, the eyelets 46 on each of the hinged side and the latch side are identical. In other words, each of the locations 156, 158, 160, and 162 have identical eyelets 46. To reverse the gate 142, lock 180 and stop 178 are removed from their respective pins 176, the latch 188 is opened, and the gate 142 is lifted off the four eyelets 46. Then the gate 142 is spun around its vertical axis to locate the pins 176 where the pins 184 had been and to locate the pins 184 where the pins 176 had been. The gate 142 is let down so as to drop pins 176, 184 in place and so as to open and then lock the jaws 190, 192 about its respective eyelet 46 where pin 176 had been. Then, stop 178 and lock 180 are placed back on their respective pins 176.

Figure 9:
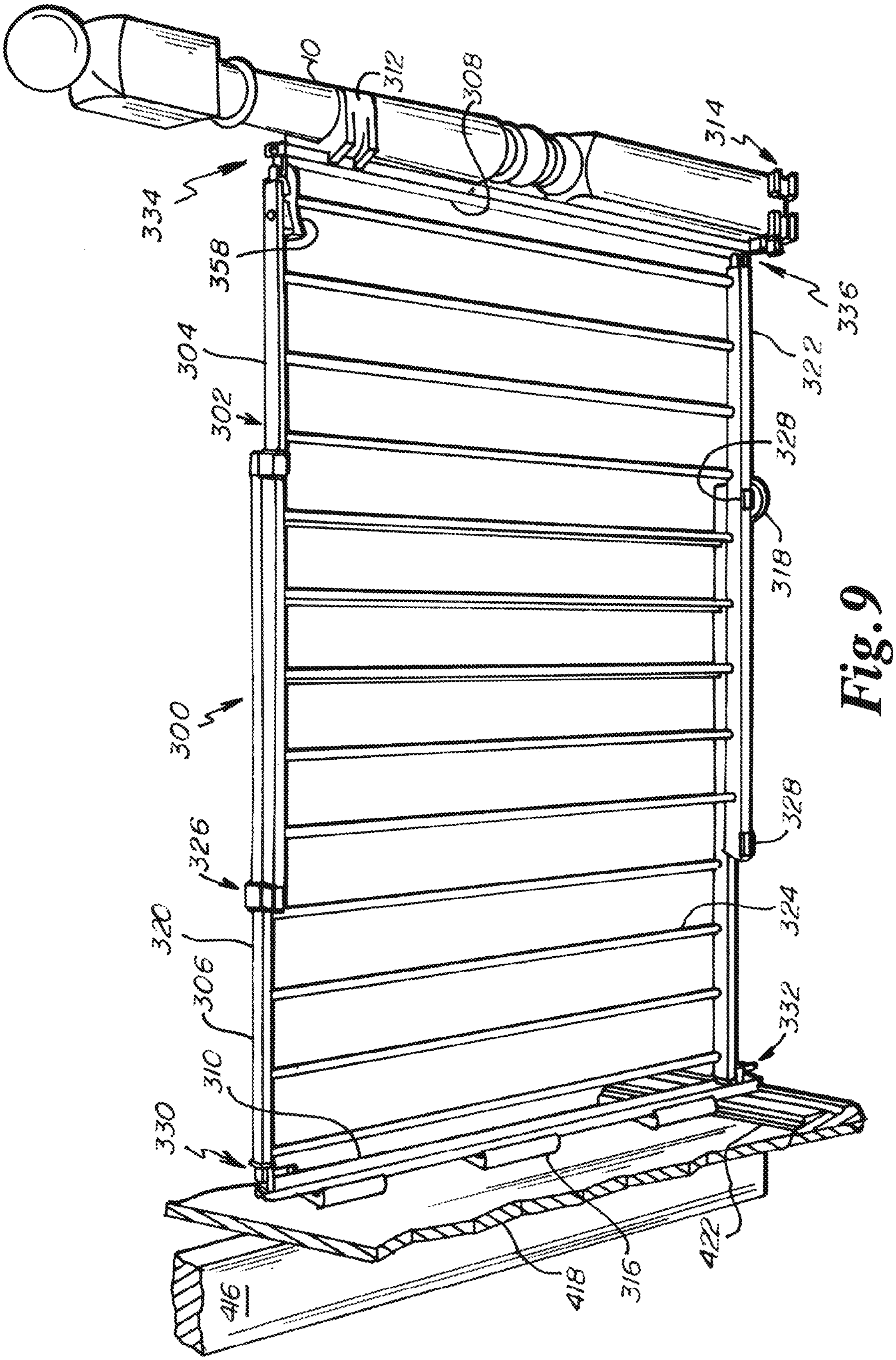
FIG. 9 is a perspective view of an alternate embodiment of the gate of FIG. 5.

As shown in FIG. 9, an improved embodiment of the present invention includes a gate apparatus 300 that includes a gate 302 having two gate portions 304 and 306. Gate portion 304 is a latch side gate portion. Gate portion 306 is a hinge side gate portion. Gate apparatus 300 further includes an elongate member or gate base 308 that can serve as either the latch side gate base or hinge side gate base. Gate apparatus 300 further includes an elongate member or gate base 310 that can serve as either the latch side gate base or hinge side gate base. Gate apparatus 300 further includes a stairway post upper adapter or upper resilient isolator 312 and a set of stairway post lower adapters or lower resilient isolators 314. Gate apparatus 300 further includes a set of wall spacers 316 and a height adjustable foot 318 for supporting the gate 302 relative to the floor.

As shown in FIG. 9, gate 302 includes a pair of gate portions or gate panels 304, 306. Each of the gate portions 304, 306 is engaged to one of the elongate support members or gate bases 308, 310. Each of the gate portions 304, 306 is also engaged to the other of the gate portions 304, 306. The gate portions 304, 306 are generally identical to each other. However, their respective pin assemblies at the four corner locations are different.

Each of the gate portions 304, 306 includes an upper horizontally extending lateral support member 320. Upper support member 320 is a metal tube.

Each of the gate portions 304, 306 includes a lower horizontally extending lateral support member 322. Lower support member 322 is a metal tube.

Each of the gate portions 304, 306 includes a set of upright vertically extending longitudinal support members 324. Upright support members 324 are fixed to and between upper and lower support members 320, 322. Upright support members 324 may be metal tubes or metal rods.

Each of the gate portions 304, 306 is disposed in generally a plane. Upper and lower support members 320, 322 run parallel to each other. Upright support members 324 are fixed at right angles to the upper and lower support members 320, 322.

Gate portions 304, 306 are slideably engaged to each other via cradles or saddles 326. Each of the cradles 326 is rigidly fixed, such as by welding, to a lateral support member of one of the gate portions 304, 306 and then extends over to and captures or hooks a confronting lateral support member to capture the other of the gate portion 304, 306 but at the same time permit a slide by type of motion.

Each of the gate portions 304, 306 includes a proximal end that confronts one of the elongate support members or gate bases 308, 310 and a distal end opposite of the proximal end. At the distal end of each of the gate portions 304, 306, such gate portion includes the rigidly affixed cradle 326, and this cradle 326 then extends over to capture, via a lip or hook 328, the other of the support member 320 or 322 and this other support member 320 or 322 then slides within this lip or hook 328.

Gate portions 304, 306 are extendable relative to each other to as to block off a relatively wide passageway. Gate portions 304, 306 are retractable relative to each other so as to block off a relatively narrow passageway. The extendibility and retractability of the gate portions 304, 306 is incremental. That is, there are no predefined locations that determine the width of gate 302. In other words, gate portions 304, 306 can fit any passageway with a unique width, as long as the passageway is not too wide and as long as the passageway is not too narrow.

Gate portions 304, 306 are extendable relative to each other until the upper cradles 326 make contact with each other or until the lower cradles 326 make contact with each other, events that happen at about the same time. Or, if desired, the extension motion may be stopped by metal stops or tabs welded onto the upper and/or lower members 320, 322, which metal stops or tabs may be spaced four to six inches from the distal end of the gate portion 304, 306, and which metal stops or tabs make contact with the hook 328 carrying the nylon bearing 440 to stop the extension motion. Gate portions 304, 306 are retractable relative to each other until the distal ends of the upper and lower support members 320, 322 run into or make contact with the opposing elongate support member or gate base 308, 310. Or the retraction motion may be terminated by the distal end of gate portion 306 making contact with the proximal end of jaw 362 such as portion 372 of jaw 362.

The opposing elongate support member or gate base 308, 310 is the elongate support member or gate base to which the support member 320, 322, having such distal end, is not directly connected. It should be noted that the sliding action of the gate portions 304, 306 relative to each other is a friction fit type of sliding action, and the sliding action is placed into play when setting up two elongate support members or gate bases 308, 310 and one corresponding gate 302. The structure that provides the friction fit type of sliding action is cradle 326, wherein the support member 320, 322 that slides in cradle 326 is held in cradle 326 with a friction fit with lip or hook 328.

Gate 302 is engaged to the two elongate support members or gate bases 308, 310 at four locations 330, 332, 334, 336. Locations 330 and 334 are upper locations. Locations 332 and 336 are lower locations. Locations 330, 332 relate to one gate portion 306 and may be referred to as left locations or hinge side locations. Locations 334, 336 relate to the other gate portion 304 and may be referred to as right locations or latch side locations.

Figure 10A:
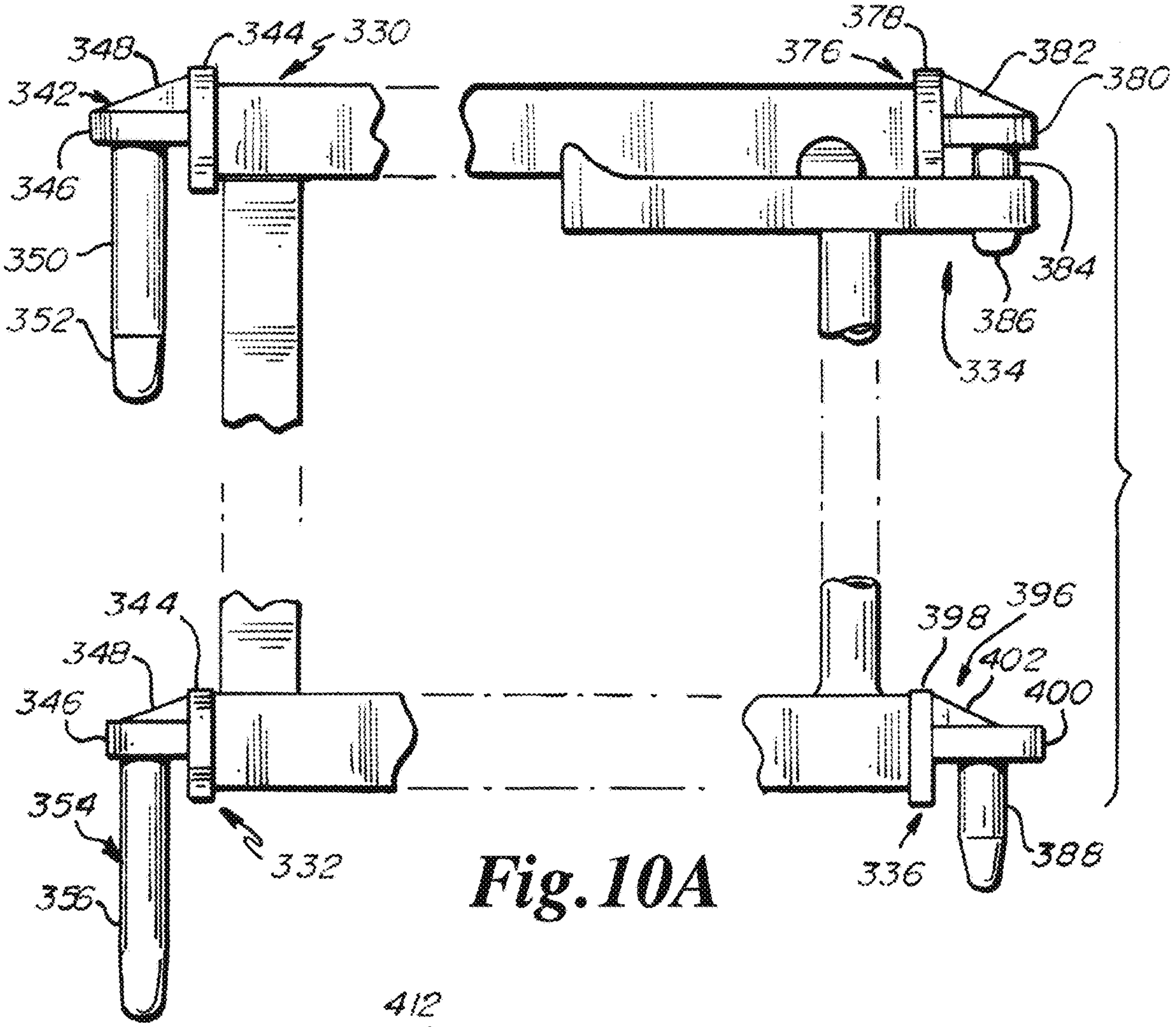
FIG. 10A is a side view of a pin apparatus for each of the corner locations of the gate of FIG. 9.
Figure 10B:
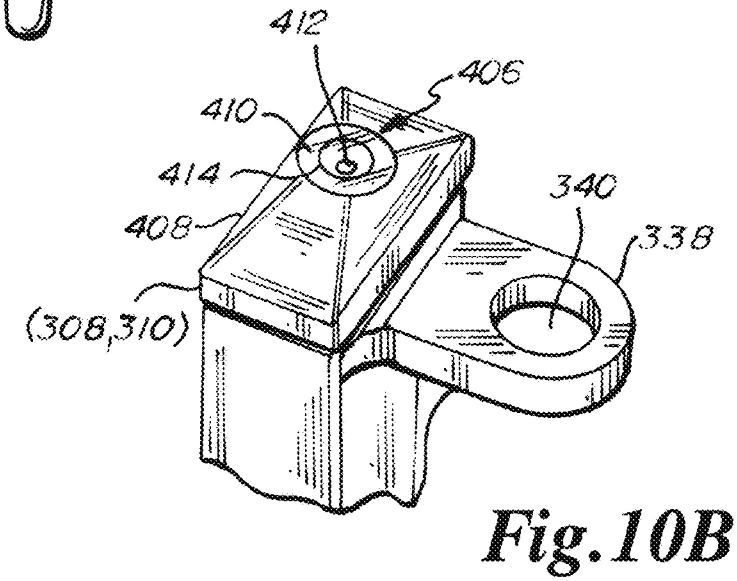
FIG. 10B is a partial perspective view of an upper end of each of the gate bases of FIG. 9 showing the bubble level in the upper end.

At each of the four locations 330, 332, 334, 336, an eyelet 338 is engaged to elongate support member or gate base 308, 310. Eyelet 338 is shown in FIG. 10B and includes a through hole 340. Eyelet 338 is one-piece with elongate support member or gate base 308, 310. Through hole 340 has a vertical axis. Eyelet 338 includes an upper surface that is flat and a lower surface that is flat. Eyelet 338 includes a sidewall that, at its distal portion, is curved.

At location 330, a pin apparatus 342 is employed. Pin apparatus 342 is shown in FIG. 10A. Pin apparatus 342 includes a plug identical to plug 170 shown in FIG. 7C, a cap 344, a head 346, a brace 348 between the cap 344 and the head 346, and a pin 350. Pin 350 includes a squeezable distal end 352 that serves as a stop or lock. In its rest state, distal end 352 is expanded and includes upper edges or barbs or stops. The upper edges or barbs or stops resiliently expand and are naturally biased to expand to a distance greater than the diameter of the through hole 340 such that pin 350 is secured in eyelet 338. However, when distal end 352 is squeezed, the upper edges or barbs or stops are brought together such that the upper edges or barbs or stops have a joint diameter less than the diameter of the through hole 340 such that pin 350 can be withdrawn from eyelet 338. Distal end 352 can be molded, for example, in two half-sections such that, at the rest state, each of the half-sections protrude upwardly and outwardly in the nature of a barb. The half-sections can be pinched toward each other, whereupon the distal end can be withdrawn upwardly through the through hole 340. The upper edges or barbs or stops need not be pinched together when the distal end 352 is being inserted down and through the eyelet 338 as the eyelet 338 itself will draw the upper edges or barbs or stops, having tapering sides, toward each other.

The plug of pin apparatus 342 is inserted into an open distal end of upper support member 320 of gate portion 306. The plug is square in section and is sized to match the open distal end of upper support member 320. The plug is friction fit into the open distal end of upper support member 320 such that the plug can be removed from one end of the support member and placed in the other end of the support member if desired.

Cap 344 is integral and one-piece with the plug. Cap 344 is formed in the shape of a disk, stops the insertion of plug into the open distal end of upper support member 320 and closes off the open distal end of upper support member 320.

Head 346 is the head of pin 350. Head 346 and pin 350 are integral and one-piece with cap 344 and the plug. Head 346 has a diameter greater than the through hole 340 formed in eyelet 338 such that head 346 will not pass through the through hole 340. Pin 350 is cylindrical in shape, except for the squeezable distal end 352, and this cylindrical portion includes a diameter less than the diameter of through hole 340 such that pin 350 is readily passable into and through the through hole 340. At its lower distal end, pin 350 includes the squeezable end 352. The end 352 has the above described upper edges or barbs. The lower portion of end 352 is spherical or tapered for a guided insertion into eyelet 338.

A distance between the proximal end of pin 350 (or lower surface of head 346) and the upper edge or barb of the distal end 352 can be described as a distance A. Distance A is a relatively long distance. Pin 350 can ride vertically along distance A without popping out of eyelet 338 as long as the squeezable distal end 352 is not squeezed.

At location 332, a pin apparatus 354 is employed. Pin apparatus 354 is shown in FIG. 10A. Pin apparatus 354 includes a plug identical to plug 170 shown in FIG. 7C, cap 344, head 346, brace 348 between the cap 344 and the head 346, and a pin 356. Pin 356 is cylindrical except for the lower end portion that is spherical or tapered for a guided insertion into eyelet 338.

The plug of pin apparatus 354 is inserted into an open distal end of lower support member 322 of gate portion 306. The plug is square in section and is sized to match the open distal end of lower support member 322. The plug is friction fit into the open distal end of lower support member 322 such that the plug can be removed from one end of the support member and placed in the other end of the support member if desired.

Cap 344 is integral and one-piece with the plug. Cap 344 is formed in the shape of a disk, stops the insertion of plug into the open distal end of lower support member 322 and closes off the open distal end of lower support member 322.

Head 346 is the head of pin 356. Head 346 and pin 356 are integral and one-piece with cap 344 and the plug. Head 346 has a diameter greater than the through hole 340 formed in eyelet 338 such that head 346 will not pass through the through hole 340. Pin 356 is cylindrical in shape, except for the lower end that is spherical or tapered, and this cylindrical portion includes a diameter less than the diameter of through hole 340 such that pin 356 is readily passable into and through the through hole 340.

A distance between the proximal end of pin 356 (or lower surface of head 346) and the tip of the lower spherical end can be described as a distance B. Distance B is a relatively long distance. Pin 356 can ride vertically along distance B without popping out of eyelet 338 (on the lower end portion of gate base 310) as long as the squeezable distal end 352 of pin 350 is not squeezed. Distance B is equal to distance A plus the length of distal end 352. If desired, pin apparatus 342 can be used at location 332 to provide two sets of barbs or locks to the hinge side of the gate 302.

Figure 11A:
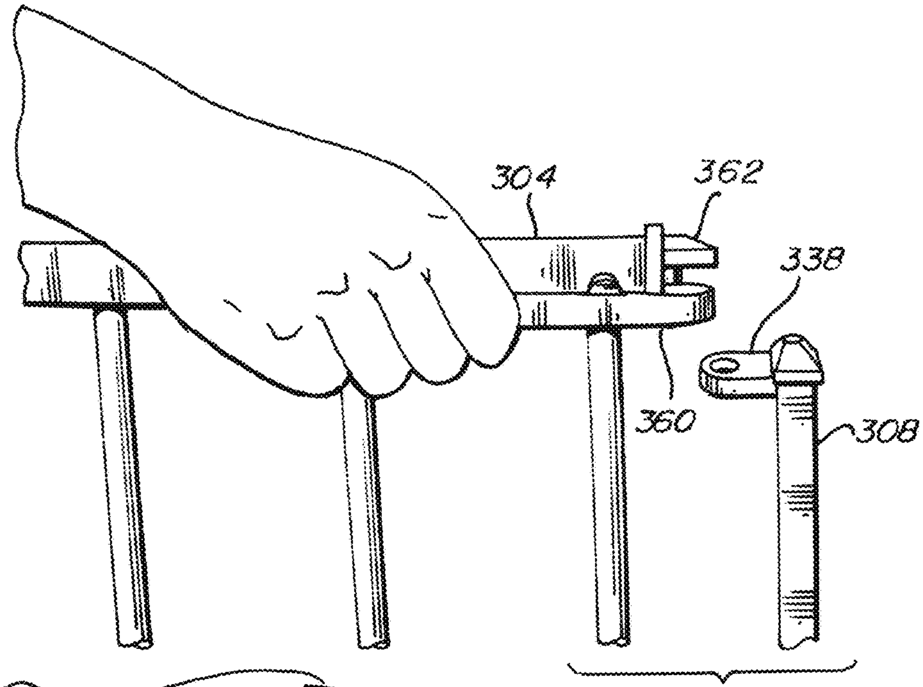
FIG. 11A is a partial perspective view of the gate of FIG. 9 and shows that the gate can be lifted relative to the latch side gate base after disengagement of the latch side pin assembly from the eyelet.
Figure 11B:
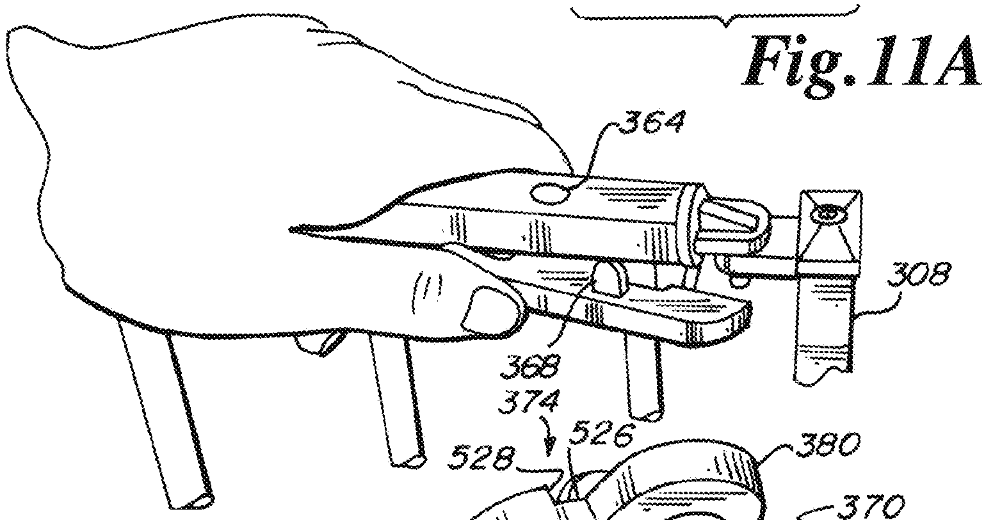
FIG. 11B is a partial perspective view of the gate of FIG. 9 and shows the latch being pinched, whereupon the gate may be lifted out of the eyelets of the latch side gate base.
Figure 11C:
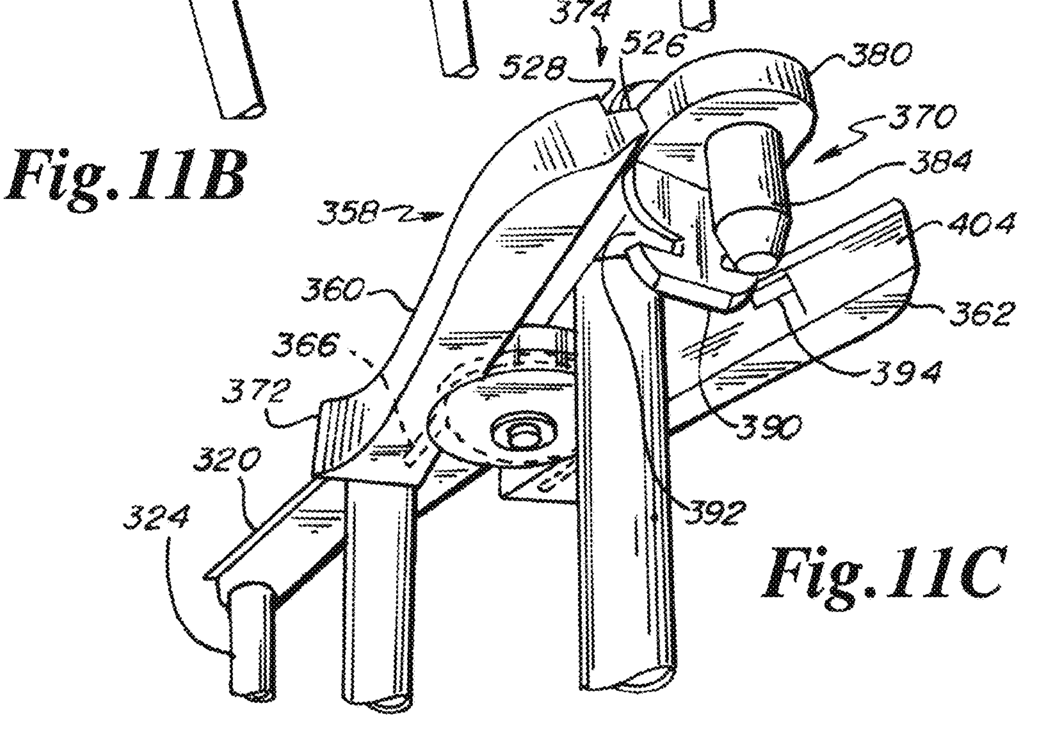
FIG. 11C is a partial perspective view of the gate of FIG. 9, and shows the latch from underneath, with the latch being in an open pinched position.

At location 334, a latch 358 having two jaws 360, 362 is employed, as shown in FIGS. 11A, 11B, and 11C. Latch 358 is fixed to an end portion of upper member 320 of gate portion 304 via a vertically or longitudinally extending pin or rivet 364 engaged to upper member 320. Pin or rivet 364 may sandwich between its two ends the upper member 320 and each of the proximal disk end portions of jaws 360, 362. Jaws 360, 362 are engaged to and pivot about a proximal, lower end of pin 364. Jaws 360, 362 are biased inwardly via a coil spring 366. One end of coil spring 366 may be engaged in jaw 360 and the other end of coil spring 366 is engaged in the other jaw 362.

Each of the jaws 360, 362 includes posts or stops or towers or travel limiters 368, which are integral and one-piece with their respective jaws. Each of the stops 368 includes a flat, vertically extending face that confronts and makes contact with the side faces of upper support member 320. Each of the stops 368 is on an outer end portion of its respective jaw so as to be adjacent to or confront a pin apparatus 370.

Coil or tension spring 366 is under a bias to draw in the outer ends of jaws 360, 362 and this drawing in action ceases when the flat faces of the stops 368 hit the side faces of upper support member 320. Each of the proximal ends of jaws 360, 362 includes a protrusion 372 that works in the nature of finger grips. A user opens the latch 358 by a pivoting action, and this pivoting action is initiated by the thumb and forefinger squeezing or pinching against the protrusions 372, so as to rotate the outer distal ends of the jaws 360, 362 outwardly and away from each other.

At the distal ends of jaws 360, 362, each of the jaws 360, 362 includes a recess 374 for receiving the eyelet 338. These recesses 374 work in the nature of a stop or lock to prevent the upper support member 320, and the gate 302 as a whole, from being lifted upwardly when the jaws 360, 362 are at the rest position, i.e., when the jaws 360, 362 are fully drawn in by coil spring 366. However, once the distal ends of the jaws 360, 362 are pivoted apart from each other, the recesses 374 no longer engage the lower surface of the eyelet 338 and can pass upwardly beyond the eyelet 338. More specifically, recess 374 includes a horizontally extending surface 526 and a vertically extending surface 528. Surfaces 526 and 528 are formed at a right angle relative to each other. A lower surface of the eyelet 338 confronts surface 526 when the jaws 360, 362 are closed. A side surface of the eyelet 338 confronts surface 528 when the jaws 360, 362 are closed.

It should be noted that the proximal end of jaw 360 is journaled to and swings about pin 364, that proximal end of jaw 360 rotates on top of proximal end of jaw 362, and that proximal end of jaw 362 also is journaled to and swings about pin 364. Each of the proximal ends of the jaws 360, 362 includes the shape of a disk, which disks rotate relative to each other, one above the other.

The set of jaws 360, 362 is swingably engaged to one gate portion 304. As shown in FIG. 10A, the set of jaws 360, 362 when closed confront a pin apparatus 376 at location 334. Pin apparatus 376 includes a plug identical to plug 170 shown in FIG. 7C, a cap 378, a head 380, a brace 382 between the cap 378 and the head 380, and a pin 384. Pin 384 extends vertically and is cylindrical except for the lower end portion that is frustoconical or tapered for a guided insertion into eyelet 338.

The plug of pin apparatus 376 is inserted into an open distal end of upper support member 320 of gate portion 304. The plug is square in section and is sized to match the open distal end of upper support member 320. The plug is friction fit into the open distal end of upper support member 320 such that the plug can be removed from one end of the support member and placed in the other end of the support member if desired.

Cap 378 is integral and one-piece with the plug. An upper end of cap 378 is formed in the shape of a disk, stops the insertion of plug into the open distal end of upper support member 320 and closes off the open distal end of upper support member 320.

Head 380 is the head of pin 384. Head 380 and pin 384 are integral and one-piece with cap 378 and the plug. Head 380 has a width greater than the through hole 340 formed in eyelet 338 such that head 380 will not pass through the through hole 340. Pin 384 is cylindrical in shape, except for the lower end that is frustoconical or tapered, and this cylindrical portion includes a diameter less than the diameter of through hole 340 such that pin 384 is readily passable into and through the through hole 340. The lower end of pin 384 tapers downwardly and inwardly.

A distance between the proximal end of pin 384 (or lower surface of head 380) and the tip of the lower frustoconical end can be described as a distance C. Distance C is a relatively short distance. Distance C is less than each of distance A and distance B such that gate 302 can be lifted up and swung while hinge side pins 350 and 356 remain engaged in their respective eyelets 338. Distance C is less than each of distance A and distance B such that the lower end of pin 384 clears its respective eyelet 338 prior to when hinge side pins 350, 356 clear their respective eyelets 338.

The distal ends of jaws 360, 362 confront the upper pin 384 between the head 380 and free end 386 of the upper pin 384. The upper eyelet 338 of the elongate member or gate base 308 is disposed between the head 380 of the upper pin 384 and the distal ends of the jaws 360, 362 when the set of jaws 360, 362 is closed. When open, the distal ends of the jaws 360, 362 are disposed apart from each other by a distance greater than a width of the eyelet 338 such that the jaws 360, 362 can be lifted up over the eyelet 338, such that the upper pin 384 can be removed from the eyelet 338 when the jaws 360, 362 are opened. When the jaws 360, 362 are opened, the gate portions 304, 306 and the gate 302 as a whole can be lifted up such that the upper pin 384 and a lower pin 388 of the latch side of the gate 302 (of gate portion 304) can be disengaged from said upper and lower eyelets 338 of elongate support member or gate base 308 such that the gate portions 304, 306 and gate 302 as a whole can be swung via the upper and lower pins 350, 356 of the hinge side of the gate 302 (of the other gate portion 306) so as to open the gate 302.

It should be noted that cap 378 of pin apparatus 376 includes a downwardly extending portion 390 that includes a pair of slots 392 formed therein. The slots 392 receive therein edge portions 394 of the jaws 360, 362. When the edge portions 394 are engaged in the slots 392, vertical travel of the jaws 360, 362 is minimized. Edge portions 394 are between a proximal end of each of the jaws 360, 362 and the beveled portion 404 of jaws 360, 362. Edge portion 394 is formed in a recess in each of the jaws 360, 362, which recess is partially formed by a beveled portion 404. This beveled portion 404 confronts downwardly extending portion 390 such that a rearward slippage of jaws 360, 362 is minimized.

Lower pin 388 is part of a pin apparatus 396 for location 336. Pin apparatus 396 includes a plug identical to plug 170 shown in FIG. 7C, a cap 398, a head 400, a brace 402 between the cap 398 and the head 400, and the pin 388. Pin 388 extends vertically and is cylindrical except for the lower end portion that is frustoconical or tapered for a guided insertion into eyelet 338. The lowermost end of the lower end portion is spherical, also for a guided insertion into eyelet 338.

The plug of pin apparatus 396 is inserted into an open distal end of lower support member 322 of gate portion 304.

The plug is square in section and is sized to match the open distal end of lower support member 322. The plug is friction fit into the open distal end of lower support member 320 such that the plug can be removed from one end of the support member and placed in the other end of the support member if desired.

Cap 398 is integral and one-piece with the plug. An upper end of cap 398 is formed in the shape of a disk, stops the insertion of plug into the open distal end of lower support member 322 and closes off the open distal end of lower support member 322.

Head 400 is the head of pin 388. Head 400 and pin 388 are integral and one-piece with cap 398 and the plug. Head 400 has a width greater than the through hole 340 formed in eyelet 338 such that head 400 will not pass through the through hole 340. Pin 388 is cylindrical in shape, except for a lower end portion that is frustoconical or tapered. The lowermost end of the lower end portion is spherical. Pin 388 throughout includes a diameter less than the diameter of through hole 340 such that pin 388 is readily passable into and through the through hole 340. The lower end of pin 388 tapers downwardly and inwardly, and the lowermost end of the lower end portion that is spherical also tapers downwardly and inwardly.

A distance between the proximal end of pin 388 (or lower surface of head 400) and the tip of the lowermost end that is spherical in shape can be described as a distance D. Distance D is a relatively short distance. Distance D is less than each of distance A and distance B such that gate 302 can be lifted up and swung while hinge side pins 350 and 356 remain engaged in their respective eyelets 338. Distance D is less than each of distance A and distance B such that the lower end of pin 388 clears its respective eyelet 338 prior to when hinge side pins 350, 356 clear their respective eyelets 338. Distance D is about the same as distance C such that the latch side pins 384 and 388 clear their respective eyelets 338 at about the same time. Distance D may be about one-eighth of an inch longer than distance C such that pin 388 is a lead pin when the gate 302 is swung closed, then lifted to clear the eyelets 338 of the hinge side gate base 308, and then swung about one-quarter of an inch more until the pins 384, 388 drop into their respective eyelets 338.

Location 330 is associated with a distance A. Location 332 is associated with a distance B. Distances A and B are equal and can be referred to as a first distance. Location 334 is associated with a distance C. Location 336 is associated with a distance D. Distances C and D are about equal and can be referred to as a second distance. The second distance is less than the first distance such that the free ends of latch side pins 384 and 388 clear their respective eyelets 338 prior to when the upper ends of the barbs of distal end 352 hitting the undersurface of the upper eyelet 338 of gate base 310.

It should be noted that each of the jaws 360, 362 includes a proximal end and a distal end. The proximal ends of the jaws are swingably engaged to one gate portion 304. The distal ends of the jaws 360, 362 when in a closed position confront the upper pin 384 of the upper support member 320 of the one gate portion 304. The distal ends of the jaws 360, 362 are biased to be normally in the closed position. The distal ends of the jaws 360, 362 include respective confronting inner surfaces 404. These inner surfaces 404 are beveled such that, when the jaws 360, 362 are dropped on the upper eyelet 338, the upper eyelet 338 hits said beveled inner surfaces 404 to urge the distal ends of the jaws 360, 362 apart and permit the upper pin 384 to be fully received in the upper eyelet 338.

FIG. 10B shows a bubble level 406. Each of the gate bases 308, 310 are tubular and rectangular in cross section. Each of the gate bases 308, 310 includes an open end that is closed with a plug. Each of the upper open ends of the gate bases 308, 310 includes an upper plug 408 having therein the bubble level 406. Bubble level 406 includes therein a liquid 410 and a bubble 412 within the liquid. A circle 414 is marked on or embedded in a clear or transparent top of the bubble level 406. When the bubble 412 is at the center of the circle 414, then the axes of the upper and lower through holes 340 of the upper and lower eyelets 338 of the respective gate base 308 or 310 are perfectly vertically aligned with each other and, in such a position, the respective gate base 308 or 310 can be fixed to a wall or stairway post or other vertical surface. With a perfect vertical alignment of each of the gate bases 308, 310, the gate 302 swings easily, the gate 302 can be lifted easily with minimal friction between the pins 350, 356, 384 and 388 and their respective eyelets 338, and the pins 350, 356, 384 and 388 can be dropped into their respective eyelets 338 easily.

Figure 12A:
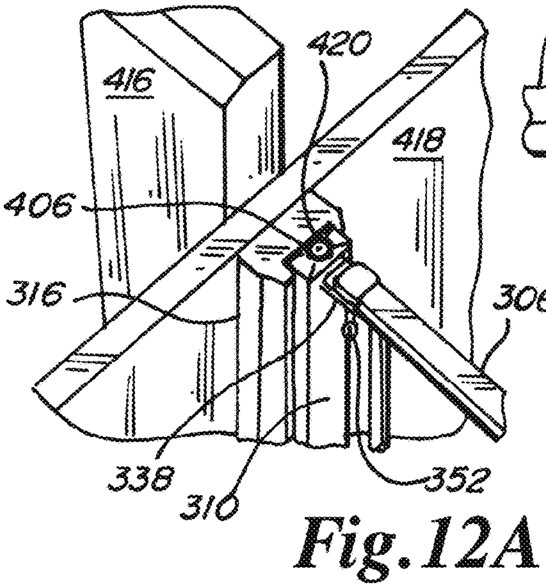
FIG. 12A is a partial perspective view of the upper hinge side of the gate of FIG. 9, showing a stud, a piece of sheet rock, a wall spacer, and the hinge side gate base, eyelet and pin apparatus.

FIG. 12A shows the upper hinge side of the gate 302 and illustrates a stud or base 416, a piece of sheet rock or wall or base 418, an upper wall spacer 316, and the hinge side gate base 310, eyelet 338 and pin apparatus 342 having the distal end 352. Wall spacer 316 is a box like piece having a vertical channel 420 formed therein for receiving three sides of the gate base 310. Wall spacer 316 is engaged to the wall 418 with a screw fastened to the stud 416. Wall spacer 316 may be engaged to the wall 418 and/or stud 416 with other pin connectors. Anchors set into the sheet rock or wall 418 may be employed to engage a pin connector, such as a screw, that runs through a hole formed in the wall spacer 316.

Figure 12B:
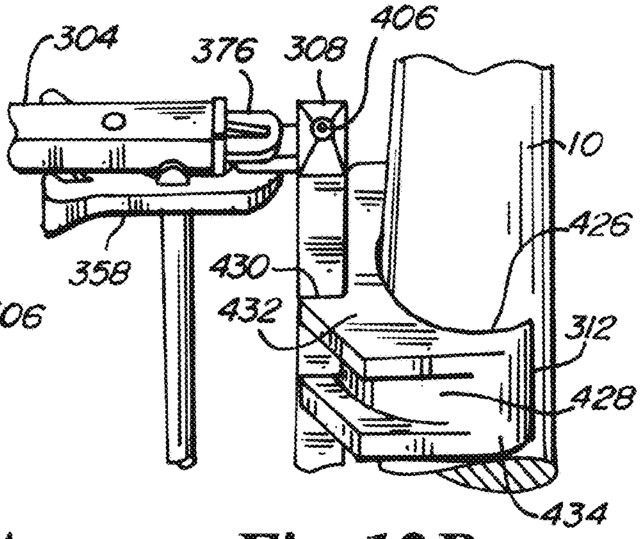
FIG. 12B is a partial perspective view of the upper latch side of the gate of FIG. 9, showing a stairway post, a top round banister or stairway post adapter or resilient isolator, the latch side gate base, and the pin apparatus of the upper latch side that includes the latch.
Figure 12C:
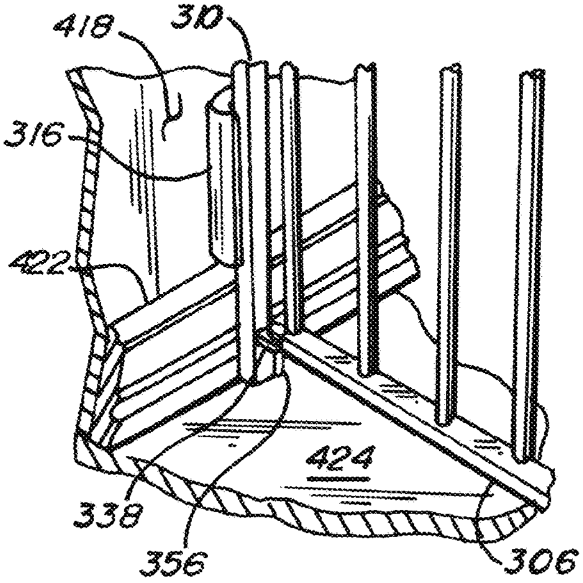
FIG. 12C is a partial perspective view of the lower hinge side of the gate of FIG. 9, showing a piece of sheet rock, a baseboard, a wall spacer to make accommodations for the baseboard, and the hinge side gate base, eyelet and pin apparatus.

FIG. 12C shows the lower hinge side of the gate 302 and illustrates the piece of sheet rock or wall 418, a baseboard 422, a lower wall spacer 316 to make accommodations for the baseboard 422, and the hinge side gate base 310, eyelet 338 and pin 356. In some applications, a baseboard 422 runs along the lower portion of the wall 418 and on top of a floor 424. The thickness of each of the upper, middle, and lower wall spacers 316 (as measured from the outer edges of the spacers 316 to the floor of the channel where the gate base 308, 310 extends) is equal to or greater than the thickness of the baseboard 422 to set the hinge side gate base 310 out apart from the baseboard 422 or at least against an outermost surface of the baseboard 422. The wall spacers 316 maintain the hinge side gate base 310 in a vertical position. Preferably three wall spacers 316 are utilized: one at a lower portion of the hinge side gate base 310, one at a middle portion of the hinge side gate base 310, and one at an upper portion of the hinge side gate base 310.

FIG. 12B shows the upper latch side of the gate 302 and illustrates a stairway post 10, a top round banister or stairway post adapter or resilient isolator 312, the latch side gate base 308, and the pin apparatus 376 of the upper latch side that includes the latch 358. Adapter 312, also shown in FIG. 15B, includes a cylindrical cutout 426 having a vertical axis. Optionally, the cutout 426 may be frustoconical. If frustoconical, the tapering of the sidewall of cutout 426 may run inwardly and downwardly or outwardly and downwardly. Adapter 312 further includes a channel 428 running horizontally or at a right angle to the axis of the cutout 426. Channel 428 receives a strap with hook and loop fasteners, such as Velcro® fasteners. Such a strap is engaged in the channel 428 and wraps about the gate base 308 the adapter 312 and the stairway post 10. Adapter 312 further includes a vertically running slot or channel 430 that engages three sides of the gate base 308 and that intersects with horizontally running channel 428. Slot or channel 430 is formed in protrusions 432 that extend horizontally and outwardly from a base 434 of the adapter 312. Outward edges of the protrusions 432 run flush with the innermost face of the gate base 308 such that the slot or channel 430 is set relatively deeply into the adapter 312. Vertically running channel 430 is also partially formed in base 434. The floor of channel 428 is rounded, but then flattens out when horizontal channel 428 intersects with vertical channel 430.

Figure 12D:
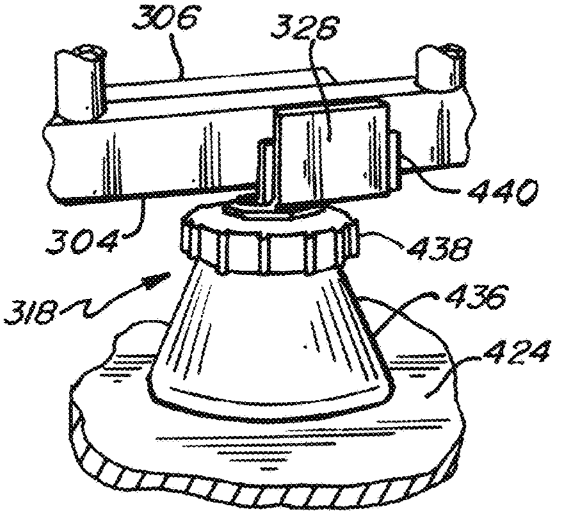
FIG. 12D is a partial perspective view of the gate of FIG. 9 and shows the height adjustable foot that engages and supports a lower portion of the gate.

FIG. 12D shows the gate 302 and illustrates the height adjustable stabilizing foot 318 that engages and supports a lower portion of the gate 302. Foot 318 includes a frustoconical sole 436 that makes contact with a surface such as the residential floor 424. Frustoconical sole 436 may be screwed up and down on a vertical screw engaged to gate portion 304. A lock washer or locking wheel 438 is also turnable up and down on the vertical screw to lock securely against the frustoconical sole 436 to prevent the sole 436 from turning to lock the sole 436 to the desired height.

Figure 12E:
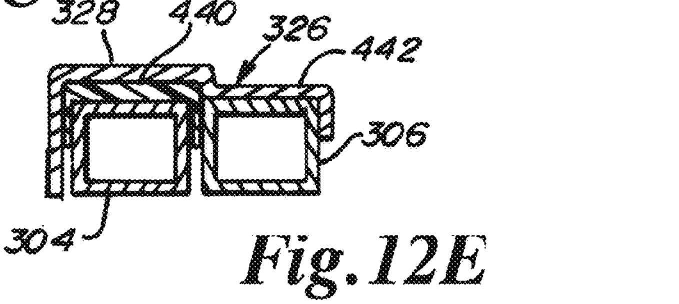
FIG. 12E is a section of the cradle or saddle that runs to and between two gate portions of the gate of FIG. 9, and illustrates a nylon or high density polypropylene bushing in the cradle for easy sliding of the gate portions relative to each other.

FIG. 12E shows a section of the cradle or saddle 326 that runs to and between the two gate portions 304, 306 of the gate 302 and illustrates a nylon or high density polypropylene bushing or bearing 440 in the hook portion 328 of the saddle 326 for easy sliding of the gate portions 304, 306 relative to each other. At the distal end of each of the gate portions 304, 306, such gate portion includes the rigidly affixed cradle 326, and this cradle 326 then extends over to capture, via a lip or hook 328, the other of the support member 320 or 322 and this other support member 320 or 322 then slides within this lip or hook 328. The nylon bearing 440 is U-shaped and engages three sides of the support member 320 or 322. The hook portion 328 engages three sides of the nylon bearing 440. Nylon bearing 440 isolates the support member 320 or 322 from the hook or hook portion 328 and further isolates the support member 320 or 322 of one gate portion 304, 306 from the other support member 320 or 322 of the other of the gate portions 304, 306, as shown in FIG. 12E. Saddle base 442 is rigidly affixed, such as by welding, to the support member 320, 322 of gate portion 306 in the form illustrated in FIG. 12E.

Figure 13A:
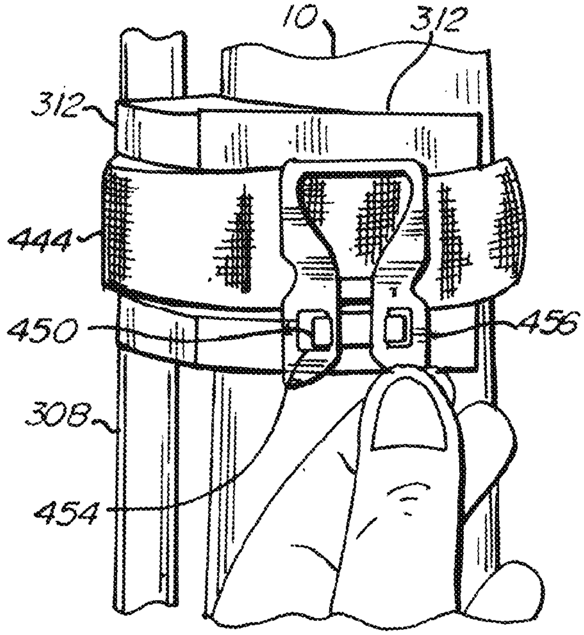
FIG. 13A is a perspective view of the gate apparatus of FIG. 9, and shows the gate base, stairway post, resilient isolator or adapter, a strap, and a strap lock in a locked or closed position, securing the strap.
Figure 13B:
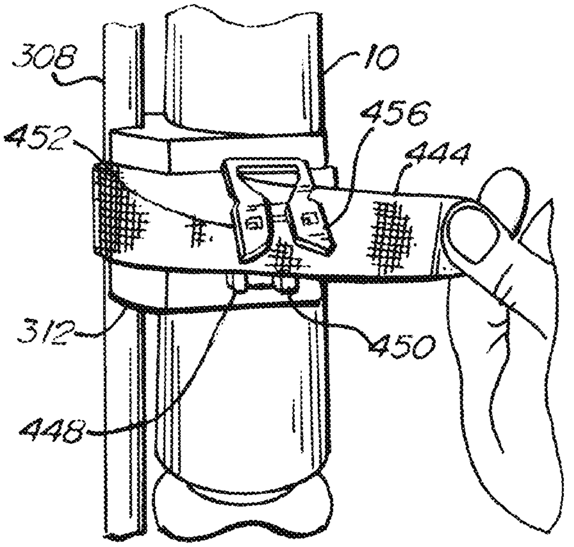
FIG. 13B is a perspective view of the gate apparatus of FIG. 9, and shows the gate base, stairway post, resilient isolator or adapter, a strap, and a strap lock in an opened position.
Figure 13C:
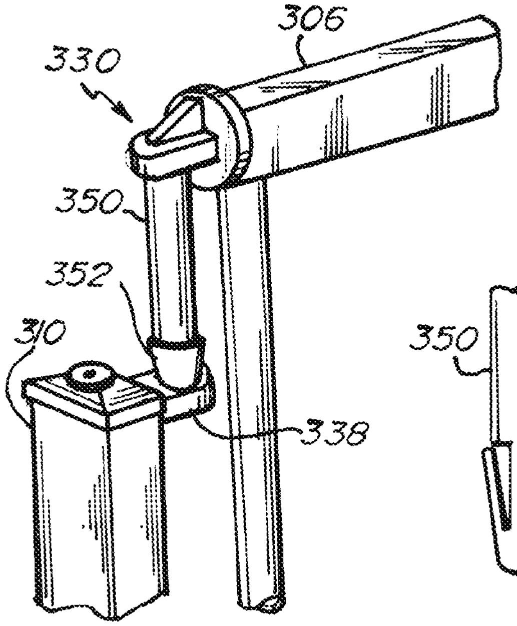
FIG. 13C is a perspective view of the upper pin assembly of the hinge side of the gate of FIG. 9 showing the pin about to engage the eyelet of the gate base.
Figure 13D:
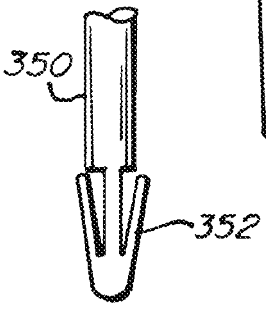
FIG. 13D is a detail view of the distal end of the pin of the pin assembly of FIG. 13C.
Figure 13E:
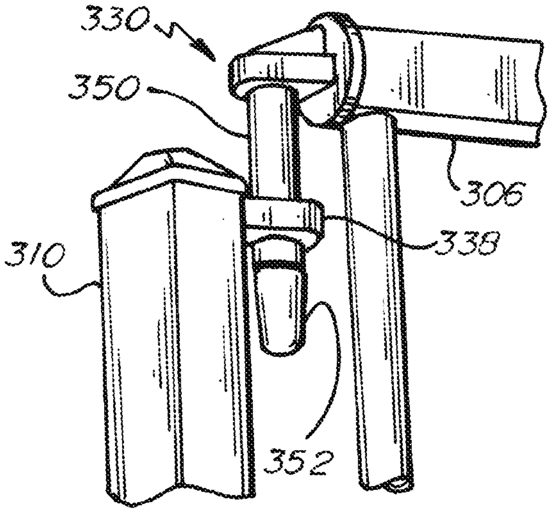
FIG. 13E is a perspective view of the upper pin assembly of FIG. 13C showing the pin having engaged the eyelet of the gate base.
Figure 14A:
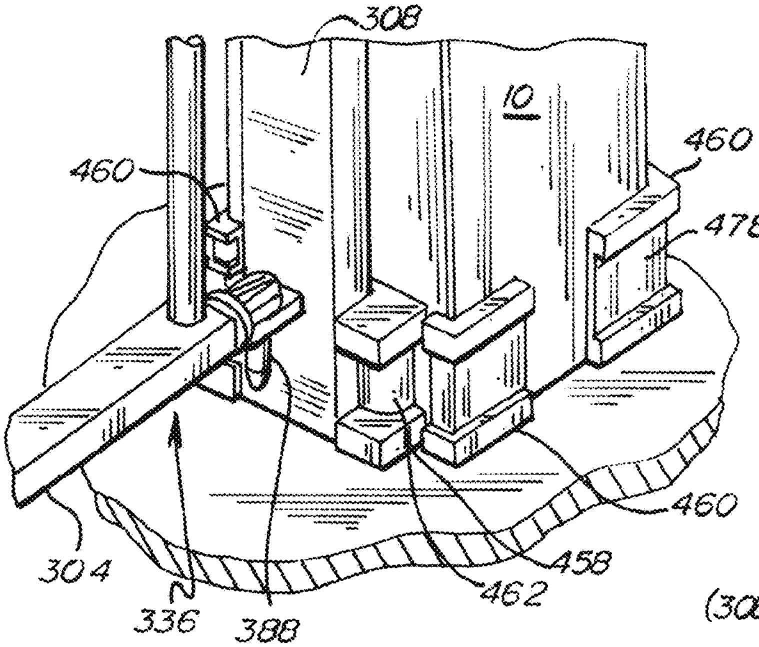
FIG. 14A is a perspective partial view of one of the gate bases of FIG. 9 engaged to a stairway post showing a resilient isolator between the gate base and a stairway post and further showing resilient isolators for receiving a strap that wraps around the gate base and stairway post.
Figure 14B:
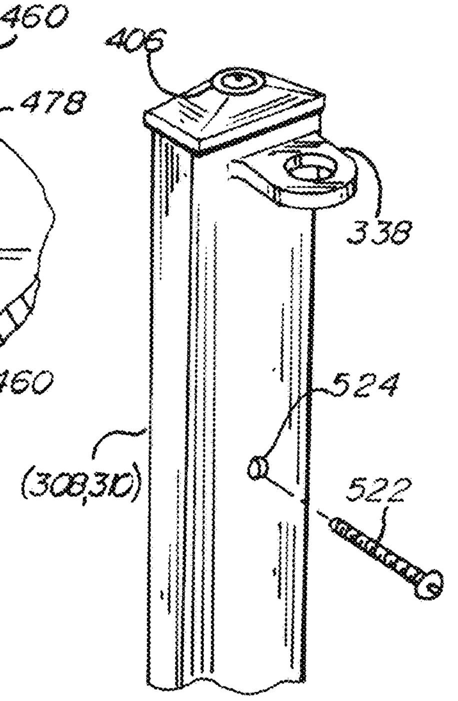
FIG. 14B is a perspective view of an upper portion of one of the gate bases of FIG. 9 showing that the gate base may be engaged with a pin connector to a vertical surface such as a studded wall, further shows an eyelet for receiving a pin apparatus of one of the upper corners of the gate, and still further shows the bubble level of the gate base.
Figure 14C:
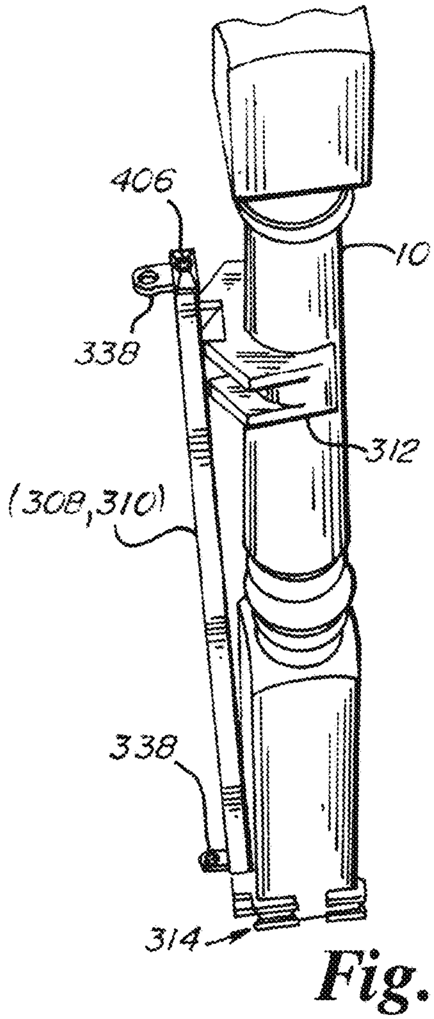
FIG. 14C is a perspective view of one of the gate bases of FIG. 9, shows the gate base about to be engaged to a stairway post with upper and lower resilient isolators.
Figure 14D:
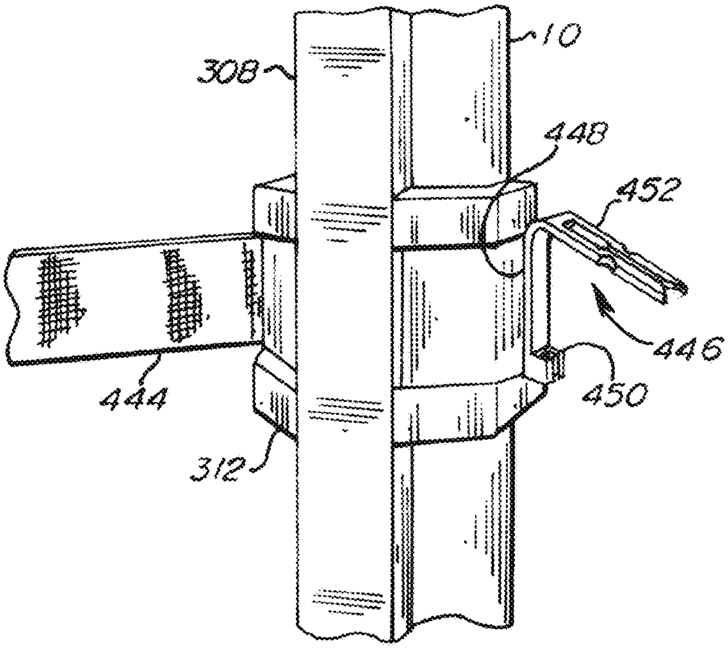
FIG. 14D is a partial perspective view and shows the lock for the strap that wraps around the gate base and stairway post of FIG. 9, where the lock is in an open position.

FIGS. 13A, 13B and 14D show a strap 444 locked by a one-piece and integral locking tab apparatus 446. Locking tab apparatus 446 includes a base jaw 448 having a pair of hook or tabs 450. Swingably engaged to the base jaw 448 is a swinging jaw 452 having a pair of openings 454. Each of the openings 454 is formed in a side portion 456 of the swinging jaw 452. The side portions 456 are squeezable to and away from each other to draw the openings 454 to and away from each other. To lock the locking tab apparatus 446, the swinging jaw 452 is swung toward the base jaw 448 and the side portions 456 are squeezed toward each other to hook inner edge strips of the side portions 456 under the hooks 450. Then the side portions 456 are released, and the side portions 456 under bias attempt to draw away from each other, thereby keeping the inner edge strips hooked under the hooks 450, and thereby locking the swinging jaw 452 to the base jaw 448 and pinching the strap 444 between the jaws 448 and 452 such that the strap 444 does not slip horizontally through the locking tab apparatus 446. To engage the strap 444 to the gate 302, the strap 444 having hook and loop connectors such as Velcro® is first wrapped relatively loosely about the adapter 312, the gate base 308 and the stairway post 10. Then the base jaw 448 is slid underneath the strap 444 such that the base jaw 448 is pinched between the strap 444 and the adapter 312. Then the adapter 312 is slid vertically to the desired position. Then the strap 444 is tightened to the desired tension to tightly engage the gate base 308 to the adapter 312 to the stairway post. At this point, the hook and loop connectors provide the requisite holding strength to hold the gate 302 in position during operation of the gate 302. However, to enhance the holding strength, the swinging jaw 452 is pressed onto the tabs or hooks 450, which may have beveled surfaces tapering inwardly toward each other, to draw the side portions 456 toward each other, such that the edge strips of the side portions 456 are engaged by the tabs or hooks 450, whereupon the hook and loop connectors of the strap 444 are squeezed together to minimize horizontal slippage of the hook and loop connector portions.

Whereas FIGS. 13A, 13B and 14D show an upper portion of gate base 308 being engaged by stairway post adapter 312, FIG. 14A shows an lower portion of gate base 308 being engaged by a set 314 of stairway post adapters, namely, a lower or bottom banister post adapter 458 and a lower or bottom corner protector or adapter 460. Locking tab apparatus 446 may also be used with a strap, such as strap 444, with adapter set 314.

Figure 15A:
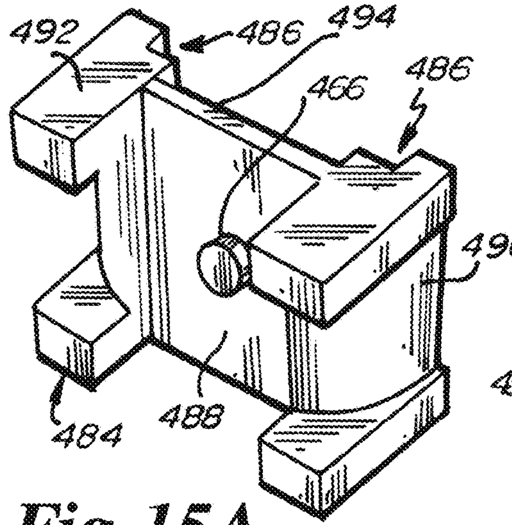
FIG. 15A is a perspective view of a stairway post adapter or resilient isolator having steps for engaging a stairway post, having a vertical channel and plug for engaging the gate base, and having a horizontal channel for engaging a strap.
Figure 15B:
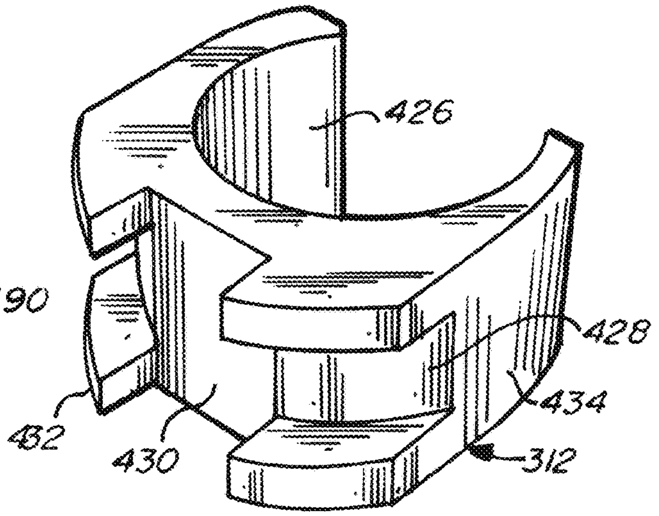
FIG. 15B is a perspective view of a stairway post adapter or resilient isolator having a rounded cutout for engaging a stairway post, having a vertical channel for engaging the gate base, and having a horizontal channel for engaging a strap.
Figure 15C:
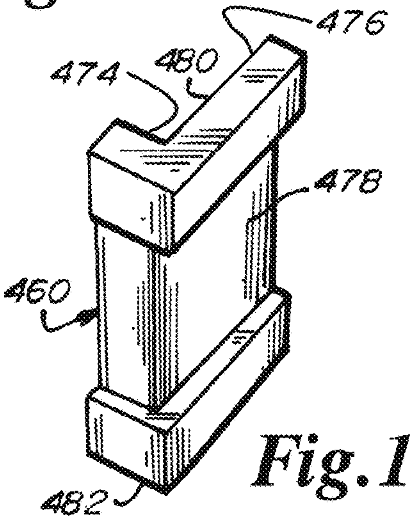
FIG. 15C is a perspective view of a stairway post adapter or resilient isolator having a right angle cutout for engaging a corner of a stairway post and having a horizontal channel for engaging a strap.
Figure 15D:
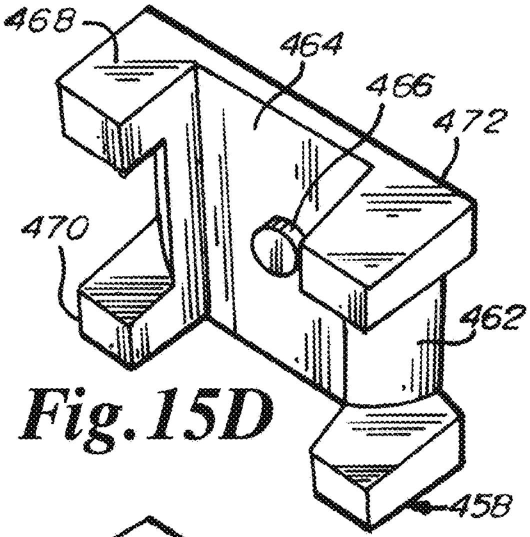
FIG. 15D is a perspective view of a stairway post adapter or resilient isolator having a planar back surface for being set against a stairway post, having a vertical channel and plug for engaging the gate base, and having a horizontal channel for engaging a strap.

Lower or bottom banister post adapter 458, also shown in FIG. 15D, includes a horizontally running channel 462 for receiving a strap such as strap 444 and a vertically running channel 464 for receiving a gate base such as gate base 308. Channel 464 engages three sides of the gate base 308 and includes a plug or key 466 for being inserted in a hole formed in the outer side of gate base 308 so as to minimize slippage of the adapter 458 relative to the gate base 308 and to align the adapter 458 at the desired height relative to gate base 308. Adapter 458 includes a body 468 that includes four protrusions 470, each of which makes up a portion of each of the channels 462 and 464. Adapter 458 includes a flat back face 472.

Lower or bottom corner protector or adapter 460 is shown in FIGS. 14A and 15C. Corner adapter 460 includes a rear side having a relatively short flat face 474 set at a right angle to a relatively long flat face 476. Such rear side having the faces 474 and 476 engages a right angled corner of a stairway post. Adapter 460 includes a front side having a channel 478 formed therein. Channel 478 runs horizontally and receives a strap such as strap 444. Right angled upper and lower flanges 480, 482 run about the upper and lower edges of the adapter 460 and form the sides of the channel 478. The floor of the channel 478 is flat. In other words, corner adapter 460 includes a right angled face made up of faces 474 and 476 for confronting a right angled corner of a stairway post 10, with said corner adapter 460 including upper and lower flanges 480, 482 forming a horizontal channel 478 for receiving the strap 444.

Four corner adapters 460 may be employed at a lower portion of a stairway post along with banister post adapter 458. A strap, such as strap 444, may be wound loosely around the four adapters 460, about the gate base 308, and about the stairway post 10. Strap 444, however, does not physically make contact with stairway post 10 so as not to mar the surface, typically wooden, of the stairway post 10. Then the base jaw 448 of the locking tab apparatus 446 is slipped under the strap 444 and against a corner protector adapter 460. Then the strap 446 is tightened. Then the swinging jaw 452 is locked to the base jaw 448 utilizing the tabs 450 having hook portions to engage the side portions 456 of the swinging jaw 452.

It should be noted that other stairway post adapters may be employed. For example, FIG. 15A shows stairway post adapter or resilient isolator 484 having steps for engaging a stairway post, having a vertical channel 488 for receiving a gate post and the plug or key 466 for engaging an opening in the outer face of the gate base, and having a horizontal channel 490 for engaging a strap such as strap 444. Channels 488 and 490 engage each other. Adapter 484 includes four protrusions 492, each of which forms a portion of channels 488 and 490. Steps 486 include a first pair of shallow steps that may be employed to catch the corners of a relatively wide stairway post. Steps 486 include a second pair of relatively deep steps that may be employed to catch two corners of a relatively narrow stairway post. A rear or outer face 494, opposite of channel 488 and disposed between the relatively deep pair of steps, is flat. In other words, adapter 484 includes a stepped recess 486, with the stepped recess 486 including a first pair of spaced apart sidewalls running parallel to each other and defining a first width, with the stepped recess including a second pair of spaced apart sidewalls running parallel to each other and defining a second width of lesser width than the first width, such that one adapter 484 may fit stairway posts 10 of different widths.

Figure 15E:
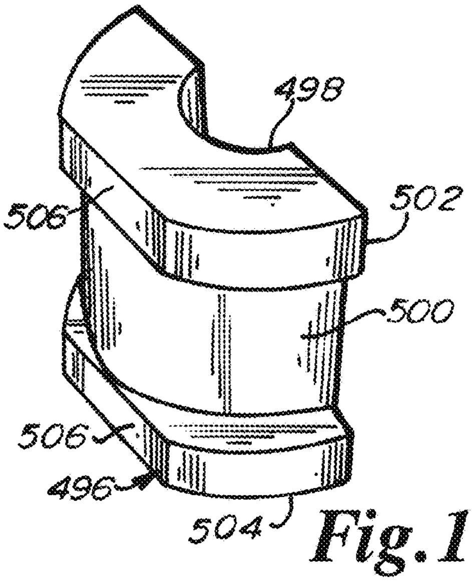
FIG. 15E is a perspective view of a stairway post adapter or resilient isolator having a rounded cutout for engaging a stairway post and having a horizontal channel for engaging a strap.

Another example of a stairway post adapter is shown in FIG. 15E. FIG. 15E shows a stairway post adapter or resilient isolator 496 having a rounded cutout 498 for engaging a relatively narrow cylindrical or tapering stairway post and having a horizontal channel 500 for engaging a strap such as strap 444. Horizontal channel 500 is formed in part by upper flange 502 and lower flange 504. Each of the flanges 502, 504 includes a flat face portion 506 that confronts the outer flat face of the gate base 308 or 310. The floor of channel 500 is rounded and may be coaxial with cutout 498. Adapter 496 may be engaged between one of the gate posts 308, 310 and a stairway post. Cutout 498 may be cylindrical or may be frustoconical. If frustoconical, the tapering of the sidewall of cutout 498 may run inwardly and downwardly or outwardly and downwardly. In other words, adapter 496 includes a curved recess 498 that confronts the stairway post 10, with the curved recess 498 having an axis that extends generally parallel to an axis of the elongate member or gate base 308, 310, with the adapter 496 including a pair of upper and lower flanges 502, 504 running horizontally, with each of the upper and lower flanges 502, 504 having a flat face portion 506 for confronting an outer face of the elongate member or gate base 308, 310, and with the adapter 496 including a horizontal channel 500 for receiving the strap 444. Curved recess 498 extends between about 10 degrees and about 180 degrees.

Figure 15F:
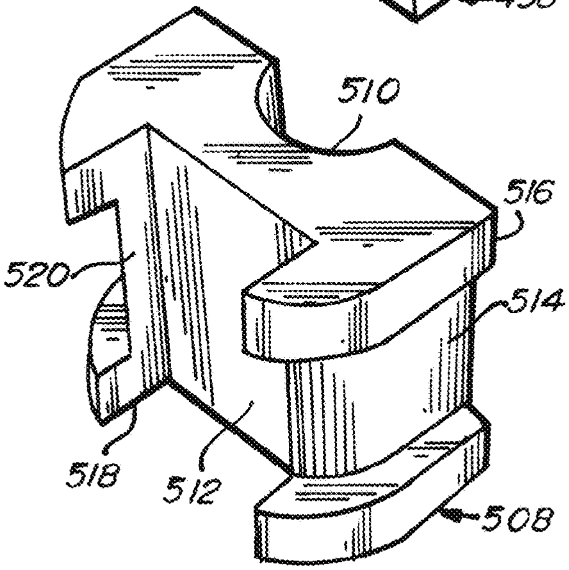
FIG. 15F is a perspective view of a stairway post adapter or resilient isolator having a rounded cutout for engaging a stairway post, having a vertical channel for engaging a gate base, and having a horizontal channel for engaging a strap.

Another example of a stairway post adapter is shown in FIG. 15F. FIG. 15F shows a stairway post adapter or resilient isolator 508 having a rounded cutout 510 for engaging a stairway post, having a vertical channel 512 for engaging one of the gate bases 308, 312, and having a horizontal channel 514 for engaging a strap such as strap 444. Each of the channels 512, 514 is formed in part by upper and lower flanges 516 and 518. Vertical channel 512 is partially recessed into a body 520 of adapter 508. Cutout 510 may be cylindrical or may be frustoconical. If frustoconical, the tapering of the sidewall of cutout 510 may run inwardly and downwardly or outwardly and downwardly. Adapter 508 is engaged between one gate post 308, 310 and one stairway post.

Locking tab apparatus 446 may be employed with straps engaging any of the adapters 312, 458, 460, 484, 496 or 598, which are respectively shown in FIGS. 15A through 15F.

FIGS. 14B and 14C show further features of the gate posts 308, 310. For example, FIG. 14C shows that each of the gate posts 308, 310 has an upper eyelet 338 and a lower eyelet 338. FIG. 14B shows that eyelet 338 is one-piece with the gate post 308 or 310. FIG. 14B shows a screw 522 may run through a hole 524 formed in gate post 308 or 310. Hole 524 is formed in an inner side of gate post 308 or 310 and an aligned hole is formed in the outer side of gate post 308 or 310. Screw 522 then engages the wall spacer 316 and then engages an anchor in sheet rock 418 or the stud 416 behind the sheet rock 418. Each of gate posts 308, 310 is a metal tube.

It should be noted that there are a number of applications for the gate 302. For example, gate 302 may be mounted between 1) two walls, 2) a wall and a stairway post, 3) two stairway posts, or 4) two other vertical objects. If being mounted to a wall, gate 302 may be mounted to a wall 1) with a baseboard or 2) without a baseboard. Gate 302 may be fixed at a top of a stairway or at a bottom of a stairway. For purposes of illustration, operation of the invention will be described where the gate 302 is mounted between a wall having a baseboard and a stairway post.

In operation, in an application where there is a wall 418 having a baseboard 422 on one side and a stairway post 10 on the other side, one of the gate bases 308, 310 is mounted on the wall 418 and the other of the gate bases 308, 310 is mounted on the stairway post 10. Since the gate bases 308, 310 are identical, either of the bases 308, 310 may be engaged to the wall 418 or the stairway post 10.

A first step toward engaging one of the gate bases 308, 310 to the wall 418 is a vertical alignment of three spacers 316. A user may begin by taking one of the spacers 316 and placing it against the wall 418 just above the baseboard 422 where the gate 302 will be employed. Then the user may take one of the gate bases 308, 310 and place it against the first spacer 316, with the bottom of the gate base 308, 310 resting on the floor. Then the user may take note of the bubble level 406 and maneuver the first spacer 316 and gate base 308, 310 until the bubble 412 is centered in the circle 414. Then the user may take a pin connector, such as a screw, and put it through the bottom screw hole of the gate base 308, 310 and continue to put it through the aligned pin connector hole in the first spacer 316. The user may then engage the first spacer 316 to the wall 418 with the pin connector, but the user is advised to not fully engage the pin connector at this point in time. This process is continued with a second and third spacer 316. It may be advised to place the second spacer about midway up the gate base 308, 310 and the third spacer at a top portion of the gate base 308, 310. It may further be advised to maneuver the third or top spacer 316 with the gate base 308, 310 prior to maneuvering the second or middle spacer 316 with the gate base 308, 310 because there is more play at the top of the gate base 308, 310 then at the middle of the gate base 308, 310. In other words, it will be easier to center the bubble 412 by swinging the end or top of the gate base 308, 310; it will be more difficult to center the bubble 412 by swinging the middle of the gate base 308, 310 because a movement of one-sixteenth of an inch at the center of the gate base 308, 310 will be magnified to, for example two-sixteenths of an inch at the top of the gate base 308, 310. When the gate base 308, 310 is true on a vertical axis with the bubble 412 centered in the circle 414, then the gate base 308, 310 and three wall spacers 316 can be anchored to the wall 418 (and/or to the stud 416 behind the wall 418).

Then the other of the gate bases 308, 310 is engaged to a vertical structure opposite the gate base 308, 310 affixed to the wall 418. In this example, such vertical structure is a stairway post. Here, adapter 312 is selected because the stairway post shown in FIG. 9 has a rounded or frustoconical portion located at about a top portion of the gate base 308, 310. Also here, the set of adapters 314 is chosen because the stairway post shown in FIG. 9 has a square section portion that is located at about a lower portion of the gate base 308, 310.

As to adapter 312, the cutout 426 of the adapter 312 is slipped onto a relatively narrow section of the frustoconical portion of the stairway post 10. Then the adapter 312 is slid downwardly to a relatively wide section of the frustoconical portion of the stairway post 10 until the adapter 312 is located at an upper portion of the gate base 308, 310 or until the adapter 312 cannot be slid further downwardly because the cutout 426 reaches a portion of such frustoconical section having a diameter of about a diameter of a section of the cutout 426. Then the gate base 308, 310 is placed into the vertical channel 430 of the adapter 312 and strap 444 wrapped about the gate base 308, 310, about the adapter 312 and about the stairway post 10. Then hook and loop portions of the strap 444 are engaged so as to loosely engage strap 444 about the gate base 308, 310, adapter 312, and stairway post 10.

Then the lower set 314 of adapters is engaged to a lower portion of the stairway post. Corner adapters 460 are placed on each of the four corners of the stairway post 10. Adapter 458 is engaged to gate base 308, 310 by 1) inserting plug or key 466 into a preformed hole in the outer face of the gate base, 3098, 310 and 2) inserting the gate base 308, 310 into the vertical channel 464 of the adapter 458. In place, the outer face 472 of adapter 458 confronts the inner face of stairway post 10. Then strap 444 is engaged in horizontal channel 462 of adapter 458 and in horizontal channels 478 of the corner adapters 460, and then strap 444 is wrapped about the gate base 308, 310, adapter 458, corner adapters 460 and stairway post 10 and the hook and loop portions of the strap 444 are loosely engaged with each other. Then the bubble level 406 is monitored while maneuvering the vertical axis of the gate base 308, 310 that is engaged to the stairway post 10. The upper and lower straps may selectively be tightened and loosened until the bubble 412 is centered in the circle 414 of the bubble level 406.

After each of the gate bases 308, 310 have been fixed to their respective vertical structures in true vertical fashion, the gate 302 may be engaged to and between the gate bases 308, 310. This is accomplished by sliding the gate portions 304, 306 inwardly toward each other or outwardly away from each other depending upon the distance between the gate posts 308, 310. Then hinge side pins 350 and 354 are disposed directly above their respective upper and lower eyelets of one of the gate bases 308, 310. Then the gate 302 is let down until the hinge side pins 350, 354 pass through the through holes 340 of their respective eyelets 338, whereupon the stops or barbs or upwardly extending prongs of distal end 352 resiliently pop out. Then the latch side of the gate 302 is swung to locations 334 and 336 where pins 384 and 388 are dropped into their respective eyelets 338, whereupon the lower beveled surfaces 404 of the jaws 360, 362 automatically open up when hit by the eyelet 338, whereupon the head 380 of pin assembly 376 drops onto the upper surface of the upper eyelet 338, and whereupon the upper eyelet 338 is engaged in recesses 374. In this position, the passageway between the gate posts 308, 310 is blocked off by the gate 302. In this position, the gate portions 304, 306 are minimally, if at all, slideable inwardly or outwardly relative each other.

To open the gate 302, the proximal ends 372 of the jaws 360, 362 are pinched together, thereby swinging apart the distal ends of the jaws 360, 362 and also swinging apart surfaces 526 beyond the sidewalls of the eyelet 338 such that the latch 358 can be lifted upwardly of the eyelet 338 and such that the gate 302 as a whole can be lifted upwardly until the bottom free ends of pins 384 and 388 clear their respective eyelets 338. Once the bottom free ends of pins 384 and 388 clear their respective eyelets 338, gate 302 can be swung either in the clockwise direction or the counter-clockwise direction relative to the hinge side of the gate 302. Gate 302 can not be lifted out of the hinge side eyelets 338 because the upper ends of the resilient barbs or prongs of the distal end 352 will catch the upper hinge side eyelet 338, thereby preventing further lifting. After the user walks through the opening produced by swinging the gate 302, the gate 302 is swung to an almost closed position where the outer sides of the distal ends of the jaws 360, 362 hit the sides of the upper latch side eyelet 338. Then the user slightly lifts and swings the gate 302 to bring the distal ends of the jaws 360, 362 above the upper latch side eyelet 338. Then the user gently drops the gate 302 such that pins 384 and 388 drop into their respective eyelets 338, whereupon the upper latch side eyelet 338 hits the beveled surfaces 404 to automatically open the latch 358, which then automatically and resiliently closes under the bias of the spring 366 to engage the eyelet in the recess 374.

To reverse the gate 302 such that the hinge side of the gate 302 is engaged to the formerly opposing gate base 308, 310 and such that the latch side of the gate 302 is engaged to the formerly opposing gate base 308, 310, latch 358 is opened as described above and then distal end 352 is pinched such that the distal end 352 can be drawn out of its respective eyelet 338 such that all four pins 350, 356, 384 and 388 clear their respective eyelets 338. Then the gate 302 is turned 180 degrees on a central vertical axis, whereupon the hinge side of the gate 302 is first engaged to the other of the gate bases 308, 310 as described above. Then the latch side of the gate 302 is engaged to the other of the gate bases 308, 310 as described above.

Depending upon the type of stairway post 10 that is present, other adapters may be employed. For example, adapter 484 may be employed to a square section of a stairway post 10. In this case, either the innermost pair of steps 486 may engage two corners of the stairway post 10 or the outermost pair of steps 486 may engage two corners of the stairway post 10 depending upon the width of the square or rectangular portion of the stairway post 10. Adapter 484 may further be employed on a section of a stairway post 10 that is cylindrical or frustoconical or that is of another shape.

Other examples include adapters 496 and 508 that may be employed against a section of a stairway post 10 that is cylindrical or frustoconical or of another shape. Each of these adapters 496, 508 have respective flat surfaces 506, 512 to confront the outer face of gate base 308, 310. Adapter 508 receives gate base 308, 310 relatively deeply in its body 520.

Plugs or keys 466 on adapters 15A and 15D need not be set in the hole formed in the outer surface of the gate bases 308, 310 for the adapters 458, 484 of FIGS. 15A, 15D to function well. In fact, depending upon the shape of the stairway post 10 it may be preferable to match the adapters 458 and 484 of FIGS. 15A, 15D with the shape of the stairway post 10 instead of keying the plug 466 into such gate base hole.

Adapters 458, 484 of FIGS. 15A, 15D can slide up and down the gate bases 308, 310 even with the presence of plug or key 466. The plug or keys 466 are of minimum length.

Adapter 312 of FIG. 15B, adapter 496 of FIG. 15E, and adapter 508 of FIG. 15F may have the key or plug 466 centered on the respective flanges 506 or centered in the respective channels 430 and 512.

All adapters 484, 312, 460, 458, 496, and 508 of respective FIGS. 15A, 15B, 15C, 15D, 15E and 15F are in effect slides because one mode of fitting such adapters to the stairway post 10 is to slide such adapters up and down the stairway post 10 until a desired fit of structure or function is found, such as where the diameter of the adapter matches the diameter of the post 10, and/or such as where the shape of the adapter matches the shape of the stairway post 10.

Adapters 312, 496 and 508 include their respective curved recesses 426, 498 and 510. Each of these curved recesses 426, 498 and 510 confronts a stairway post, and each of these curved recesses 426, 498 and 510 includes an axis that extends generally parallel to an axis of the elongate member or gate base 308, 310.

Adapters 486, 312, 460, 458, 496 and 508 can be referred to as universal post adapters. In other words, the adapters of FIGS. 15A, 15B, 15C, 15D, 15E and 15F may be engaged to a wide variety of stairway posts 10.

Adapter 312 includes a curved recess 426 that extends for 180 degrees or more and slightly less than 360 degrees about a stairway post 10. Adapter 508 includes a curved recess 510 that extends for 180 degrees or less, but greater than 10 degrees, about a stairway post 10. Curved recess 426 is resilient; that is, curved recess 426 may be resiliently expanded or spread apart to capture a portion of a stairway post 10. Such resilient expansion may occur as the adapter 312 is pushed or slid upwardly or downwardly upon a frustoconical section or tapering section of a stairway post 10. Such resilient expansion may occur as the adapter 312 is pushed onto a section of a stairway post 10 in the horizontal direction.

Each of the adapters 484, 312, and 508 of FIGS. 15A, 15B and 15F includes an outer side that confronts the stairway post 10 and an inner side opposite of the outer side, wherein the outer side includes a first longitudinally extending receiver 486, 426 and 510 for receiving therein a portion of the stairway post 10, with said first longitudinally extending receiver 486, 426 and 510 extending from one end of its respective adapter to the other end of its respective adapter. Each of the adapters 484, 312, and 508 of FIGS. 15A, 15B and 15F includes an outer side that confronts the stairway post 10 and an inner side opposite of the outer side, wherein the inner side includes a second longitudinally extending receiver 488, 430 and 512, respectively, for receiving therein a portion of the elongate member or gate base 308, 310, with the second longitudinally extending receiver extending from one end of its respective adapter to the other end of its respective adapter.

Each of the adapters 484, 312, 458, and 508 of FIGS. 15A, 15B, 15D and 15F includes a horizontally running channel 490, 428, 462 and 514 formed therein for engaging the strap 444. Each of the adapters 484, 312, 458, and 508 of FIGS. 15A, 15B, 15D and 15F further includes a vertically running channel 488, 430, 464 and 512 formed therein for receiving the elongate member or gate base 308, 310. Each of the respective horizontally running channels 490, 428, 462 and 514 communicates or intersects with each of its respective vertically running channel 488, 430, 464 and 512.

Pins 350, 354, 384, 388 are easily engaged and easily disengaged with their respective eyelets 338 having through holes 340. That is, each of the diameters of the main bodies of the pins 350, 354, 384 and 388 is slightly less than the diameters of the through holes 340. The diameter of through hole 340 is slightly greater than the diameter of each of the main bodies of the pins 350, 354, 384 and 388. Each of the diameters of the main bodies of the pins 350, 354, 384 and 388 are essentially the same. Each of the diameters of the through holes 340 are essentially the same. The main bodies of the pins 350, 354, 384 and 388 are essentially cylinders and the eyelet sidewall forming the through hole 340 is cylindrical. All pins 350, 354, 384 and 388 are drop in pins, where for engagement with the eyelet 338, such pins are simply dropped in. With the exception of pin 350, the other pins (pins 354, 384 and 388) are simply lift out pins. Even with pin 350, the distal end 352 is a quick connect and quick disconnect. There is no friction fit between the pins 350, 354, 384, 388 and their respective eyelets 338. Some play, albeit minimal play, exists between the pins 350, 354, 384, 388 and their respective eyelets 338.

A stairway post adapter apparatus can be defined as one or more of the gate bases or elongate members 308, 310, one or more of the adapters 488, 312, 460, 458, 496 and 508 of FIGS. 15A, 15B, 15C, 15D, 15E and 15F, and one or more of the straps 444 for the upper and lower adapters.

The adapters 484, 312, 460, 458, 496 and 508 of the respective FIGS. 15A, 15B, 15C, 15D, 15E, and 15F are preferably formed or molded of a resilient silicone or resilient plastic material. The resiliency of such silicone or plastic material of such adapters permits the straps 444 to apply a pinching action when the straps 444 compress the adapters. It is also preferred that such resilient silicone or resilient plastic material have a high degree of friction to wood such that, when such adapters are engaged to a stairway post 10 with the strap 444, slippage in the vertical and horizontal directions is minimized.

Corner adapter 460 of FIG. 15C may be used with any of the other adapters 484, 312, 460, 458, 496 and 508 of the respective FIGS. 15A, 15B, 15C, 15D, 15E, and 15F, including the corner adapter 460 itself and including adapters 312, 496 and 508 having the curved recesses 426, 498 and 510. Preferably, when strap 444 is wrapped about a stairway post, strap 444 engages an adapter instead of the surface of the stairway post 10.

Adapter 496 having curved recess 498 may be employed at the same height on a stairway post 10 as adapter 508 having curved recess 510. In such a case, either of the adapters 496, 508 may be pinched between the stairway post 10 and the elongate member or gate post 308, 310.

Adapter 484 of FIG. 15A may be employed with adapter 458 of FIG. 15D at the same height on a stairway post 10. In such a case, either of the adapters 484 or 458 may be pinched between the stairway post 10 and the elongate member or gate post 308, 310.

Straps 444 may include conventional buckles as well as the locking buckle or locking tab apparatus 446.

Adapter 312 of FIG. 15B may fit a relatively large diametrical section of a stairway post. Adapters 496 and 508 of FIGS. 15E and 15F may fit relatively small diametrical sections of a stairway post.

A first embodiment of the present invention is shown in FIGS. 3A, 3B, 3C, 3D, 3E, 4, 5, 6, 7A, 7B, 7C, 7D, 8A, 8B, 8C and 8D. A second embodiment of the present invention is shown in FIGS. 9, 10A, 10B, 11A, 11B, 11C, 12A, 12B, 12C, 12D, 12E, 13A, 13B, 13C, 13D, 13E, 14A, 14B, 14C, 14D, 15A, 15B, 15C, 15D, 15E and 15F. It should be noted that the second embodiment is preferred. However, if desired, elements from the first embodiment may be employed in the second embodiment, and elements from the second embodiment may be employed in the first embodiment.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A gate combination comprising:

a) a right gate portion and left gate portion, the right gate portion slidingly engaged to the left gate portion such that a total length of the right and left gate portions can be slidingly increased and slidingly decreased;

b) the right gate portion including a set of upright vertically extending support members fixed to and between an uppermost horizontally extending support member of the right gate portion and a lowermost horizontally extending support member of the right gate portion;

c) the left gate portion including a set of upright vertically extending support members fixed to and between an uppermost horizontally extending support member of the left gate portion and a lowermost horizontally extending support member of the left gate portion;

d) a right upper base connector and a right lower base connector, the right upper and lower base connectors being engaged to a right base in a residential passageway;

e) a left upper base connector and a left lower base connector, the left upper and lower base connectors being engaged to a left base in said residential passageway that opposes the right base in said residential passageway;

f) right upper and lower gate connectors engaged to the right gate portion and further respectively engaged to the right upper and lower base connectors;

g) left upper and lower gate connectors engaged to the left gate portion and further respectively engaged to the left upper and lower base connectors;

h) the right upper gate connector comprising a right upper pin that engages a right upper socket in the right upper base connector;

i) the right lower gate connector comprising a right lower pin that engages a right lower socket in the right lower base connector;

j) the left upper gate connector comprising a left upper pin that engages a left upper socket in the left upper base connector, the left upper pin extending downwardly from a left upper head;

k) the left lower gate connector comprising a left lower pin that engages a left lower socket in the left lower base connector, the left lower pin extending downwardly from a left lower head;

l) the right upper gate connector being liftable from the right upper base connector;

m) the right lower gate connector being liftable from the right lower base connector;

n) the left upper gate connector being liftable from the left upper base connector;

o) the left lower gate connector being liftable from the left lower base connector;

p) a first cradle, the first cradle being rigidly affixed to the right gate portion, the first cradle including a lip that extends over to the left gate portion to slidingly capture the left gate portion; and q) a second cradle, the second cradle being rigidly affixed to the left gate portion, the second cradle including a lip that extends over to the right gate portion to slidingly capture the right gate portion.

2. The gate combination of claim 1, and further comprising a third cradle, the third cradle being rigidly affixed to one of the left gate portion and right gate portion, the second cradle including a lip that extends over to the other of the left gate portion and right gate portion to slidingly capture said other of the left gate portion and right gate portion.

3. The gate combination of claim 1, and further comprising a stabilizing foot engagable to one of the right gate portion and left gate portion that supports the gate relative to a floor.

4. A gate combination comprising:

a) a right gate portion and left gate portion, the right gate portion slidingly engaged to the left gate portion such that a total length of the right and left gate portions can be slidingly increased and slidingly decreased;

b) the right gate portion including a set of upright vertically extending support members fixed to and between an uppermost horizontally extending support member of the right gate portion and a lowermost horizontally extending support member of the right gate portion;

c) the left gate portion including a set of upright vertically extending support members fixed to and between an uppermost horizontally extending support member of the left gate portion and a lowermost horizontally extending support member of the left gate portion;

d) a right upper base connector and a right lower base connector, the right upper and lower base connectors being engaged to a right base in a residential passageway;

e) a left upper base connector and a left lower base connector, the left upper and lower base connectors being engaged to a left base in said residential passageway that opposes the right base in said residential passageway;

f) right upper and lower gate connectors engaged to the right gate portion and further respectively engaged to the right upper and lower base connectors;

g) left upper and lower gate connectors engaged to the left gate portion and further respectively engaged to the left upper and lower base connectors;

h) the right upper gate connector comprising a latch that opens the right upper gate connector relative to the right upper base connector, the right upper gate connector including a right upper pin that engages a right upper socket in the right upper base connector;

i) the right lower gate connector comprising a right lower pin that engages a right lower socket in the right lower base connector;

j) the left upper gate connector comprising a left upper pin that engages a left upper socket in the left upper base connector, the left upper pin extending downwardly from a left upper head;

k) the left lower gate connector comprising a left lower pin that engages a left lower socket in the left lower base connector, the left lower pin extending downwardly from a left lower head;

l) the right upper gate connector being liftable from the right upper base connector;

m) the right lower gate connector being liftable from the right lower base connector;

n) the left upper gate connector being liftable from the left upper base connector;

o) the left lower gate connector being liftable from the left lower base connector;

p) a first cradle, the first cradle being rigidly affixed to the right gate portion, the first cradle including a lip that extends over to the left gate portion to slidingly capture the left gate portion; and q) a second cradle, the second cradle being rigidly affixed to the left gate portion, the second cradle including a lip that extends over to the right gate portion to slidingly capture the right gate portion.

5. The gate combination of claim 4, and further comprising a third cradle, the third cradle being rigidly affixed to one of the left gate portion and right gate portion, the second cradle including a lip that extends over to the other of the left gate portion and right gate portion to slidingly capture said other of the left gate portion and right gate portion.

6. The barrier of claim 4, and further comprising a stabilizing foot engagable to one of the right gate portion and left gate portion that supports the gate relative to a floor.

7. A gate combination comprising:

a) a right gate portion and left gate portion, the right gate portion slidingly engaged to the left gate portion such that a total length of the right and left gate portions can be slidingly increased and slidingly decreased;

b) the right gate portion including a set of upright vertically extending support members fixed to and between an uppermost horizontally extending support member of the right gate portion and a lowermost horizontally extending support member of the right gate portion;

c) the left gate portion including a set of upright vertically extending support members fixed to and between an uppermost horizontally extending support member of the left gate portion and a lowermost horizontally extending support member of the left gate portion;

d) a right upper base connector and a right lower base connector, the right upper and lower base connectors being engaged to a right base in a residential passageway;

e) a left upper base connector and a left lower base connector, the left upper and lower base connectors being engaged to a left base in said residential passageway that opposes the right base in said residential passageway;

f) right upper and lower gate connectors engaged to the right gate portion and further respectively engaged to the right upper and lower base connectors;

g) left upper and lower gate connectors engaged to the left gate portion and further respectively engaged to the left upper and lower base connectors;

h) the right upper gate connector comprising a latch that opens the right upper gate connector relative to the right upper base connector, the right upper gate connector including a right upper pin that engages a right upper socket in the right upper base connector;

i) the right lower gate connector comprising a right lower pin that engages a right lower socket in the right lower base connector;

j) the left upper gate connector comprising a left upper pin that engages a left upper socket in the left upper base connector, the left upper pin extending downwardly from a left upper head;

k) the left lower gate connector comprising a left lower pin that engages a left lower socket in the left lower base connector, the left lower pin extending downwardly from a left lower head;

l) the right upper gate connector being liftable from the right upper base connector;

m) the right lower gate connector being liftable from the right lower base connector;

n) the left upper gate connector being liftable from the left upper base connector;

o) the left lower gate connector being liftable from the left lower base connector;

p) a first cradle, the first cradle being rigidly affixed to the right gate portion, the first cradle including a lip that extends over to the left gate portion to slidingly capture the left gate portion;

q) a second cradle, the second cradle being rigidly affixed to the left gate portion, the second cradle including a lip that extends over to the right gate portion to slidingly capture the right gate portion;

r) wherein the latch must be operated to open the right upper gate connector relative to the right upper base connector prior to the right upper gate connector being liftable from the right upper base connector; and s) wherein the left gate portion and right gate portion as a whole is swingable by the left upper gate connector pivoting relative to the left upper base connector and by the left lower gate connector pivoting relative to the left lower base connector, said pivoting taking place only after said latch is operated to open the right upper gate connector relative to the right upper base connector and only after said right upper gate connector and said right lower gate connectors are lifted relative to, respectively, the right upper base connector and said right lower base connector.

8. The gate combination of claim 7, and further comprising a third cradle, the third cradle being rigidly affixed to one of the left gate portion and right gate portion, the second cradle including a lip that extends over to the other of the left gate portion and right gate portion to slidingly capture said other of the left gate portion and right gate portion.

9. The barrier of claim 7, and further comprising a stabilizing foot engagable to one of the right gate portion and left gate portion that supports the gate relative to a floor.

10. A barrier for a residential passageway, comprising:

a) a right upper pin receiver and a right lower pin receiver, with the right upper and lower pin receivers being engaged to a right base in said residential passageway;

b) a left upper pin receiver and a left lower pin receiver, with the left upper and lower pin receivers being engaged to a left base in said residential passageway that opposes the right base in said residential passageway;

c) a right gate portion engaged to the right upper and lower pin receivers;

d) a left gate portion engaged to the left upper and lower pin receivers, with the right gate portion slidingly engaged to the left gate portion such that a total length of the right and left gate portions can be slidingly increased and slidingly decreased;

e) a left upper pin engaged to the left gate portion for engaging the left upper pin receiver, with the left upper pin comprising a head;

f) a left lower pin engaged to the left gate portion for engaging the left lower pin receiver, with the left lower pin comprising a head;

g) with one of the left upper pin and left lower pin comprising a stop, with said pin receiver corresponding to said one of the left upper pin and left lower pin being engaged between said stop and said head corresponding to said one of the left upper pin and left lower pin;

h) a right upper pin engaged to the right gate portion for engaging the right upper pin receiver;

i) a right lower pin engaged to the right gate portion for engaging the right lower pin receiver, with said right lower pin comprising a head and a free end; and j) wherein said stop and said corresponding head are spaced from each other by a first distance, wherein the head and free end of the right lower pin are spaced from each other by a second distance, wherein the second distance is less than the first distance, such that the free end of the right lower pin of the right gate portion clears said right lower pin receiver prior to said stop hitting the pin receiver corresponding to said stop.

11. A barrier for a residential passageway, comprising:

a) a right upper base connector and a right lower base connector, with the right upper and lower base connectors being engaged to a right base in said residential passageway;

b) a left upper base connector and a left lower base connector, with the left upper and lower base connectors being engaged to a left base in said residential passageway that opposes the right base in said residential passageway;

c) a right gate portion engaged to the right upper and lower base connectors;

d) a left gate portion engaged to the left upper and lower base connectors, with the right gate portion slidingly engaged to the left gate portion such that a total length of the right and left gate portions can be slidingly increased and slidingly decreased;

e) the left gate portion being liftable relative to the left upper and lower base connectors;

f) the right gate portion being liftable relative to the right upper and lower base connectors;

g) a right upper gate connector on the right gate portion and engagable to the right upper base connector;

h) a right lower gate connector on the right gate portion and engagable to the right lower base connector;

i) a left upper gate connector on the left gate portion and engaged to the left upper base connector;

j) a left lower gate connector on the left gate portion and engaged to the left lower base connector;

k) the right upper gate connector disengaging the right upper base connector when the left and right gate portions have been lifted by a first distance;

l) the right lower gate connector disengaging the right lower base connector when the left and right gate portions have been lifted by a second distance;

m) one of the left upper gate connector and left lower gate connector comprising a pin that comprises a head and a stop;

n) a pin receiver that receives said pin, said pin receiver being on the left upper base connector or left lower base connector that corresponds to the left upper gate connector or left lower gate connector that includes said pin;

o) said pin receiver being between said head and said stop and stopping lifting of the left and right gate portions when the left and right gate portions are lifted relative to the left upper and left lower base connectors and when the stop hits the pin receiver; and p) the head and the stop being spaced from each other by a third distance that is greater than the first and second distances such that the right upper and right lower gate connectors disengage from the right gate portion prior to the stop hitting the pin receiver.

12. A gate combination comprising:

a) a right upper base connector and a right lower base connector, with the right upper and lower base connectors being engaged to a right base;

b) a left upper base connector and a left lower base connector, with the left upper and lower base connectors being engaged to a left base that opposes the right base;

c) a right gate portion engaged to the right upper and lower base connectors;

d) a left gate portion engaged to the left upper and lower base connectors, with the right gate portion slidingly engaged to the left gate portion such that a total length of the right and left gate portions can be slidingly increased and slidingly decreased;

e) the left gate portion being liftable relative to the left upper and lower base connectors;

f) the right gate portion being liftable relative to the right upper and lower base connectors;

g) a right upper gate connector on the right gate portion and engagable to the right upper base connector;

h) a right lower gate connector on the right gate portion and engagable to the right lower base connector;

i) a left upper gate connector on the left gate portion and engaged to the left upper base connector;

j) a left lower gate connector on the left gate portion and engaged to the left upper base connector;

k) each of the right and left gate portions having an upper transversely extending support member;

l) each of the right and left gate portions having a lower transversely extending support member;

m) first, second, third, and fourth cradles, each of the cradles having first and second portions, the first portion being rigidly fixed to one of the upper and lower transversely extending support members, the second portion slidingly engaging one of the upper and lower transversely extending support members, the second portion having a base integral with the first portion and further having an easy slide material between the base and said one of the upper and lower transversely extending support members that the second portion engages for permitting easy sliding between the second portion and said one of the upper and lower transversely extending support members;

n) the first portion of the first cradle being rigidly fixed to the upper transversely extending support member of the right gate portion, the second portion of the first cradle engaging the upper transversely extending support member of the left gate portion;

o) the first portion of the second cradle being rigidly fixed to the upper transversely extending support member of the left gate portion, the second portion of the second cradle engaging the upper transversely extending support member of the right gate portion;

p) the first portion of the third cradle being rigidly fixed to the lower transversely extending support member of the right gate portion, the second portion of the third cradle engaging the lower transversely extending support member of the left gate portion; and q) the first portion of the fourth cradle being rigidly fixed to the lower transversely extending support member of the left gate portion, the second portion of the fourth cradle engaging the lower transversely extending support member of the right gate portion.

* * * * *